(12) United States Patent
Minefuji

(10) Patent No.: US 10,824,059 B2
(45) Date of Patent: Nov. 3, 2020

(54) PROJECTION SYSTEM AND PROJECTION-TYPE IMAGE DISPLAY APPARATUS

(71) Applicant: SEIKO EPSON CORPORATION, Tokyo (JP)

(72) Inventor: Nobutaka Minefuji, Omachi (JP)

(73) Assignee: SEIKO EPSON CORPORATION, Tokyo (JP)

(\*) Notice: Subject to any disclaimer, the term of this patent is extended or adjusted under 35 U.S.C. 154(b) by 0 days.

(21) Appl. No.: 16/356,113

(22) Filed: Mar. 18, 2019

(65) Prior Publication Data
US 2019/0285972 A1  Sep. 19, 2019

(30) Foreign Application Priority Data

Mar. 19, 2018 (JP) .................................. 2018-050566

(51) Int. Cl.
| | | |
|---|---|---|
| G03B 21/14 | (2006.01) | |
| H04N 9/31 | (2006.01) | |
| G02B 27/09 | (2006.01) | |
| G02B 7/02 | (2006.01) | |

(52) U.S. Cl.
CPC ........... G03B 21/142 (2013.01); G02B 7/021 (2013.01); G02B 27/0955 (2013.01); H04N 9/315 (2013.01)

(58) Field of Classification Search
CPC .. G03B 21/142; G02B 7/021; G02B 27/0955; H04N 9/315
See application file for complete search history.

(56) References Cited

U.S. PATENT DOCUMENTS

| | | | |
|---|---|---|---|
| 7,009,765 B2 | 3/2006 | Gohman | |
| 2005/0036207 A1* | 2/2005 | Yamasaki | G02B 15/177 359/676 |
| 2006/0193036 A1 | 8/2006 | Suzuki | |
| 2007/0184368 A1* | 8/2007 | Nishikawa | G02B 17/08 430/30 |
| 2010/0128345 A1 | 5/2010 | Suzuki | |
| 2012/0019791 A1* | 1/2012 | Abe | G03B 21/28 353/99 |
| 2014/0204351 A1* | 7/2014 | Matsuo | G02B 15/15 353/98 |
| 2016/0216497 A1 | 7/2016 | Minefuji | |

(Continued)

FOREIGN PATENT DOCUMENTS

| | | |
|---|---|---|
| JP | 2006-235516 A | 9/2006 |
| JP | 2007-147970 A | 6/2007 |

(Continued)

*Primary Examiner* — Michelle M Iacoletti
*Assistant Examiner* — Magda Cruz
(74) *Attorney, Agent, or Firm* — Oliff PLC

(57) ABSTRACT

A first optical group that forms an intermediate image and a second optical group that enlarges and projects the intermediate image formed by the first optical group satisfy a variety of conditions. Therefore, the overall length of the entire lens system of the projection system is reduced in a linear arrangement, or the distance between the first optical group and the second optical group is increased and an optical path deflector that deflects the optical path is disposed at the middle of the optical path between the first and second optical groups to fold the optical path.

18 Claims, 18 Drawing Sheets

(56) References Cited

U.S. PATENT DOCUMENTS

| | | |
|---|---|---|
| 2016/0238822 A1 | 8/2016 | Minefuji |
| 2016/0238825 A1 | 8/2016 | Minefuji |
| 2016/0299415 A1 | 10/2016 | Minefuji |
| 2016/0306268 A1 | 10/2016 | Minefuji |
| 2016/0363746 A1 | 12/2016 | Minefuji |
| 2018/0173088 A1 | 6/2018 | Minefuji |
| 2019/0331901 A1* | 10/2019 | Minefuji ................ G03B 21/28 |

FOREIGN PATENT DOCUMENTS

| | | |
|---|---|---|
| JP | 2011-150030 A | 8/2011 |
| JP | 2016-138962 A | 8/2016 |
| JP | 2016-151686 A | 8/2016 |
| JP | 2016-151687 A | 8/2016 |
| JP | 2016-151688 A | 8/2016 |
| JP | 2017-003846 A | 1/2017 |
| JP | 2017-187662 A | 10/2017 |
| WO | 16/199393 A1 | 12/2016 |
| WO | 16/199426 A1 | 12/2016 |

* cited by examiner

PROJECTION SYSTEM AND PROJECTION-TYPE IMAGE DISPLAY APPARATUS

BACKGROUND

1. Technical Field

The present invention relates to a projection system suitable to be incorporated in a projection-type image display apparatus that enlarges and projects an image on an image display device, such as a projector, and a projection-type image display apparatus using the projection system.

2. Related Art

In recent years, a projection system used in a projector and capable of providing a large screen in short-distance projection has been proposed, as described, for example, in JP-A-2007-147970, JP-A-2006-235516, and JP-A-2011-150030.

In a case where the projection system is formed only of a refractive optical system, however, the upper limit of the increased field angle is about a half angle of view of 60°. In contrast, for example, in JP-A-2006-235516, using a refractive optical system and a concave mirror allows an ultrawide half angle of view, for example, greater than or equal to 70°. In JP-A-2006-235516, however, generation of an intermediate image causes a problem of an increase in length of the overall projection system. In another approach, for example, JP-A-2011-150030 describes that a refractive system is formed of about six lenses to achieve cost reduction. However, a half angle of view of about 52° or so, which is a value close to that achieved in JP-A-2011-150030, can be achieved by only a refractive system, and omitting a focusing group to achieve a simple configuration causes, for example, a problem of an insufficient range over which the magnification is changed.

SUMMARY

A projection system according to an aspect of the invention includes a first optical group formed of a plurality of lenses and having positive power and a second optical group formed of a single reflection surface having a concave shape with the first optical group and the second optical group sequentially arranged from a reduction side. The first optical group forms an intermediate image of an image in a reduction-side conjugate position. The second optical group enlarges and projects the intermediate image formed by the first optical group. The first optical lens group includes a first-first lens group having positive power and a first-second lens group having positive or negative power, and a boundary between the first-first lens group and the first-second lens group is specified by a ratio between effective aperture diameters of lens surfaces of adjacent lenses that form the first optical group with the lens surfaces separate from each other by an air space, the boundary being an air space where h2/h1 exceeds 1.2 for the first time sequentially from the reduction side, where h1 represents the effective aperture diameter of a reduction-side lens surface in the air space and h2 represents the effective aperture diameter of an enlargement-side lens surface in the air space, the first-first lens group located on the reduction-side and the first-second lens group located on the enlargement-side. The first-second lens group is formed of two lenses. The projection system satisfies a conditional expression $$0.05 < f1/TL < 0.2 \tag{1}$$

where f1 represent a focal length of the first optical group, and TL represents a distance from a surface closest to the reduction side in the first optical group to an enlargement-side surface in the second optical group.

In the projection system described above, the first optical group, which forms an intermediate image, and the second optical group, which enlarges and projects the intermediate image formed by the first optical group, satisfy the condition described above. Therefore, first of all, in a case where the projection system is incorporated in the projection-type image display apparatus, such as a projector, a satisfactorily displayed large screen is achieved in proximate projection. Further, in addition to the above, the overall length of the projection system can be reduced in a linear arrangement to achieve a compact configuration, or the distance between the first optical group and the second optical group can be increased and a member that deflects the optical path in two directions can be disposed at the middle of the optical path between the first and second optical groups. That is, the entire optical system can have a configuration that is more compact than in related art.

A projection-type image display apparatus according to another aspect of the invention includes a light modulation device that modulates light from a light source to form an image and the projection system described above that projects the image on the light modulation device. In this case, the projection-type image display apparatus, which includes the projection system described above, allows a large screen to be satisfactorily displayed in proximate projection and further allows the apparatus to have a compact configuration.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A projection system according to a first embodiment of the invention and a projection-type image display apparatus incorporating the projection system will be described below in detail with reference to the drawings.

Figure 1:
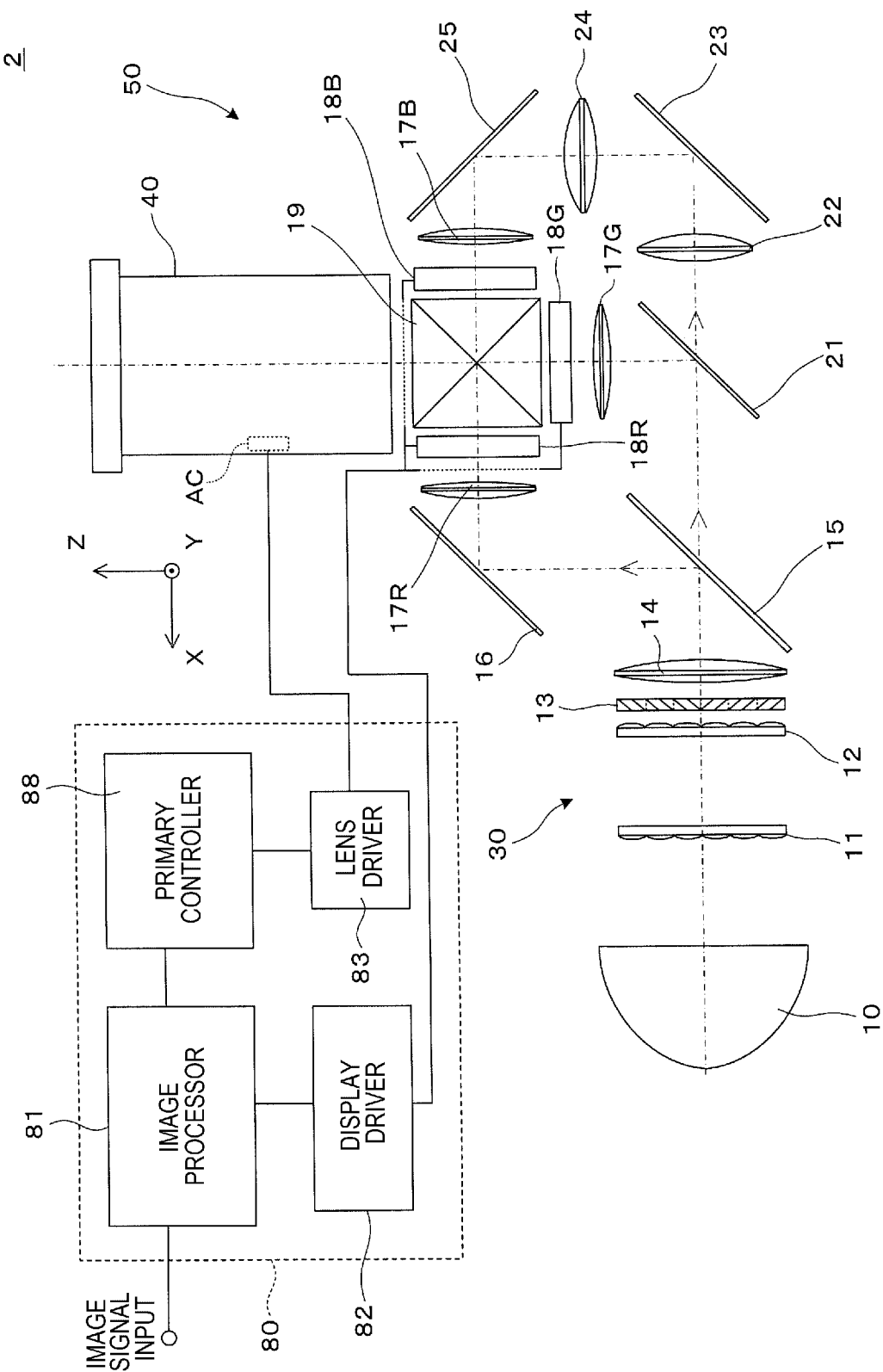
FIG. 1 shows a schematic configuration of a projector that incorporates a projection system according to a first embodiment.

A projector 2, which is a projection-type image display apparatus incorporating the projection system according to the first embodiment, includes an optical system section 50, which projects image light, and a circuit apparatus 80, which controls the action of the optical system section 50, as shown in FIG. 1.

In the optical system section 50, a light source 10 is, for example, an ultrahigh-pressure mercury lamp and emits light containing R light, G light, and B light. The light source 10 may instead be a discharge light source other than an ultrahigh-pressure mercury lamp or a solid-state light source, such as an LED and a laser. A first optical integration lens 11 and a second optical integration lens 12 each have a plurality of lens elements arranged in an array. The first optical integration lens 11 divides a light flux from the light source 10 into a plurality of light ray fluxes. The lens elements of the first optical integration lens 11 each focus the light flux from the light source 10 in the vicinity of the corresponding lens element of the second optical integration lens 12. The lens elements of the second optical integration lens 12, which cooperate with a superimposing lens 14, form images of the lens elements of the first optical integration lens 11 on liquid crystal panels 18R, 18G, and 18B. The configuration described above allows a display area of each of the liquid crystal panels 18R, 18G, and 18B to be entirely illuminated with the light from the light source 10 at roughly uniform brightness.

A polarization conversion element 13 converts the light from the second optical integration lens 12 into predetermined linearly polarized light. The superimposing lens 14 superimposes the images of the lens elements of the first optical integration lens 11 on one another on the display area of each of the liquid crystal panels 18R, 18G, and 18B via the second optical integration lens 12.

A first dichroic mirror 15 receives the R light, the G light, and the B light incident thereon from the superimposing lens 14, reflects the R light, and transmits the G light and the B light. The red light reflected off the first dichroic mirror 15 travels along a reflection mirror 16 and a field lens 17R and impinges on the liquid crystal panel 18R, which is a light modulation device. The liquid crystal panel 18R modulates the R light in accordance with an image signal to form an R image.

A second dichroic mirror 21 receives the G light and the B light having passed through the first dichroic mirror 15, reflects the G light, and transmits the B light. The G light reflected off the second dichroic mirror 21 passes through a field lens 17G and impinges on the liquid crystal panel 18G, which is a light modulation device. The liquid crystal panel 18G modulates the G light in accordance with an image signal to form a G image. The B light having passed through the second dichroic mirror 21 travels along relay lenses 22 and 24, reflection mirrors 23 and 25, and a field lens 17B and impinges on the liquid crystal panel 18B, which is a light modulation device. The liquid crystal panel 18B modulates the B light in accordance with an image signal to form a B image.

A cross dichroic prism 19, which is a light combining prism, combines the light fluxes modulated by the liquid crystal panels 18R, 18G, and 18B with one another into image light and directs the image light to a projection system 40.

The projection system 40 is a zoom lens for projection that receives the image light formed of the image light fluxes modulated by the liquid crystal panels 18G, 18R, and 18B and combined with one another by the cross dichroic prism 19 and enlarges and projects the image light on a screen that is not shown.

The circuit apparatus 80 includes an image processor 81, to which an external image signal, such as a video signal, is inputted, a display driver 82, which drives the liquid crystal panels 18G, 18R, and 18B provided in the optical system section 50 based on an output from the image processor 81, a lens driver 83, which activates a drive mechanism (not shown) provided in the projection system 40 to adjust the state of the projection system 40, and a primary controller 88, which oversees and controls the actions of the circuit sections 81, 82, and 83 and other components.

The image processor 81 converts the inputted external image signal into image signals each containing grayscales and other factors on a color basis. The image processor 81 can also perform a variety of types of image processing, such as distortion correction and color correction, on the external image signal.

The display driver 82 can operate the liquid crystal panels 18G, 18R, and 18B based on the image signals outputted from the image processor 81 to allow the liquid crystal panels 18G, 18R, and 18B to form images corresponding to the image signals or images corresponding to the images having undergone the image processing.

The lens driver 83 operates under the control of the primary controller 88 and can cause an actuator AC to move part of optical elements that form the projection system 40 as appropriate along an optical axis OA to perform focusing in association with a change in magnification (focusing performed when magnification is changed) in the projection of an image on the screen via the projection system 40. The lens driver 83 can also change the vertical position of an image projected on the screen through tilt adjustment of moving the entire projection system 40 in an upward/downward direction perpendicular to the optical axis OA.

As described above, the projector 2 is a projection-type image display apparatus including the liquid crystal panels 18R, 18G, and 18B, which are each a light modulation device and each modulate the light from the light source 10 to form an image, and the projection system 40, which projects the images on the liquid crystal panels 18R, 18G, and 18B, which are each a light modulation device.

The projection system 40 according to the present embodiment will be specifically described below with reference to FIGS. 2 and 3 and other figures. The projection system 40 shown by way of example in FIG. 2 and other figures has the same configuration as that of a projection system 40 according to Example 1, which will be described later.

The projection system 40 according to the present embodiment projects an image formed on the liquid crystal panel 18G (18R, 18B) on a surface that is not shown but is irradiated with the image light. A prism PR, which corresponds to the cross dichroic prism 19 shown in FIG. 1, is disposed between the projection system 40 and the liquid crystal panel 18G (18R, 18B).

The projection system 40 includes a first optical group 40a, which is formed of a plurality of lenses and has positive power, and a second optical group 40b, which is formed of a single mirror MR having a reflection surface having a concave aspheric shape, with the first optical group 40a and the second optical group 40b sequentially arranged from a reduction side.

The first optical group 40a forms an intermediate image of the liquid crystal panel 18G (18R, 18B), which is an image display device disposed in a reduction-side conjugate position, which is conjugate with the intermediate image.

The second optical group 40b enlarges the intermediate image formed by the first optical group 40a and projects the enlarged intermediate image toward the surface to be irradiated with the image light, such as a screen.

In general, the overall length of a relay optical system that forms an intermediate image is inevitably longer than that of a typical optical system that forms no intermediate image. In contrast, the present embodiment allows the optical system having a linear configuration to have an overall length shorter than in related art.

The first optical group 40a is formed of a first-first lens group 41, which is provided on the reduction side and has positive power, and a first-second lens group 42, which is provided on an enlargement side and has positive or negative power. The first optical group 40a is formed of eleven lenses L1 to L11, with part of the lenses forming the first-first lens group 41 and the remainder forming the first-second lens group 42.

In the first optical group 40a, the boundary between the first-first lens group 41 and the first-second lens group 42 is specified by the ratio between the effective aperture diameters of the lens surfaces of adjacent lenses that form the first optical group 40a with the lens surfaces separated from each other by an air space. In a specific description, first, consider lens surfaces adjacent to each other with an air space therebetween, let h1 be the effective aperture diameter of the reduction-side lens surface, and let h2 be the effective aperture diameter of the enlargement-side lens surface. The ratios of the effective aperture diameters h2/h1 are compared with each other sequentially from the reduction side, and the air space where the ratio h2/h1 exceeds 1.2 for the first time is defined as the boundary between the reduction-side lens group or the first-first lens group 41 and the enlargement-side lens group or the first-second lens group 42. In the example shown in FIG. 3, an air space DA between the ninth lens L9 and the tenth lens L10 counted from the reduction-side is the boundary. That is, the effective aperture diameter h1 of the enlargement-side lens surface of the lens L9, which is the reduction-side lens surface in the air space DA, and the effective aperture diameter h2 of the reduction-side lens surface of the lens L10, which is the enlargement-side lens surface in the air space DA, satisfy the condition on the ratio described above.

The first-first lens group 41 has an aperture stop ST provided therein, and it is assumed in the description that the first-first lens group 41 is formed of a lens group E1 on the reduction side of the aperture stop ST and a lens group E2 on the enlargement side of the aperture stop ST. In the example shown in FIG. 3, the lens group E1 is formed of the lenses L1 to L7, and the lens group E2 is formed of the lenses L8 and L9.

Figure 2:
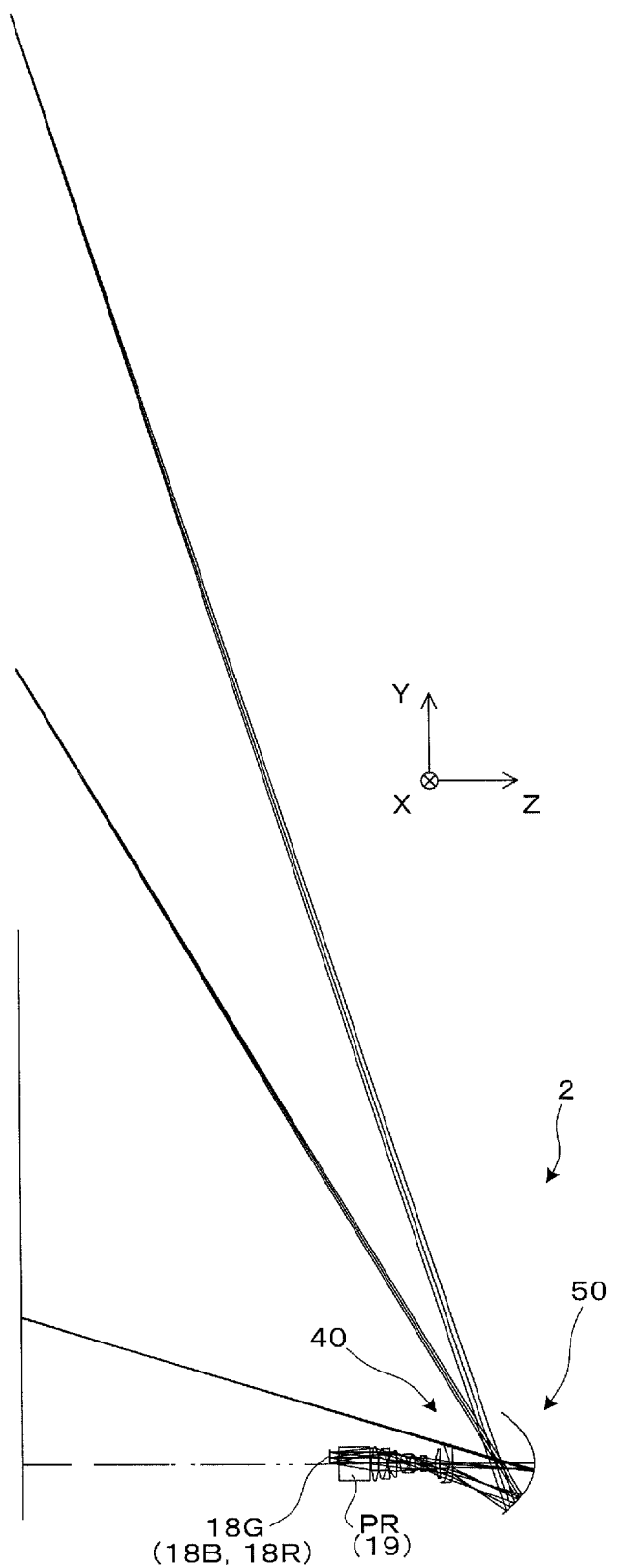
FIG. 2 is a configuration diagram and light ray diagram of a portion from the object plane to the projection surface in the projection system according to the first embodiment or Example 1.

In the example shown in FIG. 2, the first-second lens group 42 is formed of two lenses, that is, the lenses L10 and L11. Out of the two lenses, the reduction-side lens L10 is a positive lens having a convex surface facing the reduction side and having positive power. On the other hand, the enlargement-side lens L11 is a negative lens having negative power. The first-second lens group 42 has a plurality of aspheric lens surfaces.

The first-second lens group 42 moves in the optical axis direction when focusing is performed in association with a change in magnification. That is, when focusing is performed in association with a change in magnification, the first-second lens group 42 brings an image into focus by movement of at least one of the two lenses L10 and L11 with the aid of the actuator AC in the optical axis direction, that is, a direction A1 along the optical axis OA. The actuator AC can move the lenses in a variety of aspects in accordance with the aspect in which the focusing is performed when the magnification is changed. For example, the lenses may be moved independently of each other or may be moved in synchronization with each other, for example, by using a cam mechanism.

It is important that the first-first lens group 41 of the first optical group 40a has a structure for efficiently capturing the light flux from the liquid crystal panel 18G (18R, 18B), which is an image display device. In contrast, the first-second lens group 42 is responsible for the focusing performed when the projection magnification is changed. On the other hand, the second optical group 40b, which is disposed on the downstream side along the optical path, is formed only of the single aspheric mirror. Therefore, to produce a high-resolution image having a small amounts of distortion and field curvature, the first-second lens group 42, which is a focusing group, needs to form an intermediate image containing distortion and field curvature as much as possible. That is, if only the second optical group 40b, which is formed of a single aspheric mirror, forms the projection system, the produced image has large amounts of field curvature and distortion. The first optical group 40a therefore needs to form an intermediate image having field curvature and distortion having an opposite sign that cancels the field curvature and distortion produced by the second optical group 40b. Further, in an ultrawide-angle lens for proximate projection, such as the projection system 40, distortion and astigmatism occur when the magnification is changed. Aberration variation that occurs when focusing is performed therefore needs to be suppressed to a sufficiently small value. It is therefore preferable that at least two aspheric lenses are disposed in the first-second lens group 42. Further, an attempt to make an aspheric surface effective undesirably causes an increase in the lens diameter and an increase in the size of aspheric surface accordingly. It is difficult to produce a glass aspheric lens having a large diameter and a large size of aspheric surface, and such an aspheric lens is very expensive. That is, the aspheric lenses are each preferably formed of a resin lens.

A variety of conditions on the projection system 40, such as optical-system focal lengths, will be described below. The present embodiment is characterized in that the overall size of the apparatus is reduced by employing a lens configuration in which the projection system 40 is formed, for example, of 11 lenses, which is a small number of lenses as an optical system for proximate projection, to reduce the overall length of the projection system 40 for reduction in size of the entire apparatus in the optical axis direction.

The entire optical system that forms the projection system 40 first satisfies the following conditional expression:

$$0.05 < f1/TL < 0.2 \quad (1)$$

where f1 represent the focal length of the first optical group 40a, and TL represents the distance from the lens surface closest to the reduction side in the first optical group 40a to the enlargement-side surface in the second optical group 40b.

Conditional Expression (1) relates to the ratio of the focal length f1 of the first optical group 40a to the distance TL, which is the overall length of the projection system 40, and sets an appropriate size of the intermediate image formed by the first optical group 40a to allow enlargement and projection with no increase in the size of the second optical group 40b.

When f1/TL is smaller than the lower limit set by Conditional Expression (1), the focal length f1 of the first optical group 40a is too shorter than the distance TL, which is the overall length of the projection system 40, and it is therefore difficult for even the first optical group 40a, which has a small number of lenses, to satisfactorily correct the aberrations with a sufficiently long back focal length maintained.

When f1/TL is greater than the upper limit set by Conditional Expression (1), the focal length f1 of the first optical group 40a is too long, resulting in too a long distance from the first optical group 40a to the intermediate image. The size of the intermediate image increases accordingly. The second optical group 40b therefore needs to be large. That is, the situation described above is not preferable from the viewpoint of size reduction.

The projection system 40 further satisfies the following conditional expression:

$$0.1 < f/|f2| < 0.3 \quad (2)$$

where f represents the focal length of the entire projection system, and f2 represents the focal length of the second optical group 40b.

When f/|f2| is smaller than the lower limit set by the Conditional Expression (2), the light focusing power of the mirror that forms the second optical group 40b is too small, and it is therefore difficult to achieve a wide field angle, or the mirror that forms the second optical group 40b is too large, which is not preferable in terms of size reduction.

When f/|f2| is greater than the upper limit set by the Conditional Expression (2), the focal length f2 of the second optical group 40b is too short, that is, the mirror that forms the second optical group 40b is a too deep concave mirror or the inclination of the periphery of the mirror with respect to the optical axis OA increases, and it is therefore difficult to form a satisfactory mirror surface from a manufacturing viewpoint or in a molding process.

Further, in the projection system 40, the first-second group 42 is formed of a positive lens having positive power and having a convex surface facing the reduction side and a negative lens having negative power with the positive lens and the negative lens arranged from the reduction side, and the first-second group 42 has a plurality of aspheric surfaces. The projection system 40 then satisfies the following conditional expression:

$$|f/f2| < 0.1 \quad (3), \text{ and}$$

$$0.2 < |fn/fp| < 1.2 \quad (4)$$

where f12 represents the focal length of the first-second group 42, fp represent the focal length of the positive lens, that is, the lens L10, and fn represents the focal length of the negative lens, that is, the lens L11.

Conditional Expression (3) represents a condition on the ratio of the focal length f of the entire projection system to the focal length f12 of the first-second lens group 42, which serves as a focusing group.

In an ultrawide-angle optical system, such as the projection system 40, the amount by which the focal point moves when the projection distance is changed to change the magnification is changed is relatively small because the focal length f of the optical system is much shorter than the focal length of a typical projection system. In an ultrawide-angle optical system of this type, however, the angle of incidence of light incident on a screen, in particular, the periphery thereof is very large, and a change in the projection distance therefore produces not only a large amount of field curvature and astigmatism, resulting in a decrease in contrast, but a large amount of change in distortion. Therefore, to correct the aberrations to sufficiently small amounts at the time of focusing, it is preferable to change the distance between the two aspheric lenses that form the first-second lens group 42, which is a focusing group, to simultaneously perform the focusing and the aberration correction.

The focusing group is preferably formed of resin lenses, as described above. A resin lens, however, tends to experience a change in performance thereof due to a change in shape or refractive index resulting, for example, from a change in environmental conditions, such as the temperature and humidity. When |f/f12| is greater than the upper limit set by the Conditional Expression (3), the power of the focusing group is too large, that is, the power of the lenses in the focusing group is too large, and the lenses are therefore undesirably likely to be affected by a change in the environment.

In the present embodiment or in Example 1, which corresponds thereto and will be described later, in which the range over which the magnification is changed is relatively wide, the two lenses that form the first-second lens group 42 are moved independently of each other. In a case where a narrow range over which the magnification is changed is set, sufficient focusing can be achieved by movement of only one of the two lenses or movement of the two lenses as an integral unit.

From the viewpoints described above, the focal length f12, the focal lengths fp, fn, and other factors preferably satisfy Conditional Expressions (3) and (4) described above.

Conditional Expression (4) represents a condition for sufficiently reducing a change in performance at the time of focusing with the effect due, for example, to a change in environment minimized. For example, when the ratio between the focal length fp of the positive lens that form the first-second lens group 42 and the focal length fn of the negative lens that form the first-second lens group 42 does not fall within the range set by Conditional Expression (4), the amount of movement of the focal point increases, and it is therefore difficult for the other lenses to correct and cancel the aberrations.

When |fn/fp| is smaller than the lower limit set by Conditional Expression (4) and the focal length fp of the positive lens is too large, that is, when the positive power of the positive lens is too small, it is difficult to correct the field curvature and astigmatism produced when focusing is performed.

When |fn/fp| is greater than the upper limit set by Conditional Expression (4) and the focal length fn of the negative lens is too large, that is, when the negative power of the negative lens is too small, it is difficult for the first optical group 40a to have a long back focal length.

In the projection system 40, the lenses that form the first optical group 40a will be described below sequentially from the reduction side. First of all, in the first optical group 40a, the first-first lens group 41 and the first-second lens group 42 are formed of the eleven lenses in total, as described above. In the first-first lens group 41, the reduction-side lens group E1 includes the lenses L1 to L7, and the enlargement-side lens group E2 includes the lenses L8 and L9. The first-second lens group 42 includes the two lenses L10 and L11.

In the first-first lens group 41, the lens group E1, which is provided on the reduction side of the aperture stop ST, is so configured that the lenses L1, L2, L4, L5, and L7 are each a positive convex lens and the lenses L3 and L6 are each a negative concave lens. The lenses L2 and L3 form a doublet. The lens L4 is an aspheric lens having two aspheric surfaces on opposite sides. The lenses L5, L6, and L7 form a triplet.

In the first-first lens group 41, the lens group E2, which is provided on the enlargement side of the aperture stop ST, is so configured that the lens L8 is a negative concave lens and the lens L9 is a positive convex lens. The lenses L8 and L9 form a doublet.

The lenses L1 to L9 are made of glass and are each a spherical lens except the lens L4. The lenses L1 to L9 each have a circular shape axially symmetric with respect to the optical axis OA.

In the first-second lens group 42, the lens L10 is a positive meniscus lens, and the lens L11 is a negative meniscus lens. Each of the lenses L10 and L11 is an aspheric lens made of a resin, has two aspheric surfaces on opposite sides, and has a circular shape axially symmetric with respect to the optical axis OA.

As described above, the first optical group 40a is formed of the eleven lenses (lenses L1 to L11) in total.

The second optical group 40b is formed of the single mirror MR axially symmetric with respect to the optical axis OA and having a concave aspheric shape, as described above. The mirror MR reflects video image light having exited out of the first optical group 40a toward the surface to be irradiated with the image light, such as a screen.

The lenses L1 to L11, which form the first optical group 40a, and the mirror MR, which forms the second optical group 40b, each have a shape axially symmetric with respect to the optical axis OA, as described above. That is, the lenses L1 to L11 and the reflection surface of the mirror MR are rotationally symmetric with respect to the common optical axis OA.

In the thus configured projection system 40, the first optical group 40a forms the intermediate image on the upstream side of the second optical group 40b. That is, in the projection system 40, the first optical group 40a first forms an image on the upstream side of the second optical group 40b, which is a mirror, in other words, the first optical group 40a forms a primary image (intermediate image) on the upstream side of the mirror MR. Thereafter, in the projection system 40, the second optical group 40b forms an image again on the screen to perform proximate projection.

Figure 3:
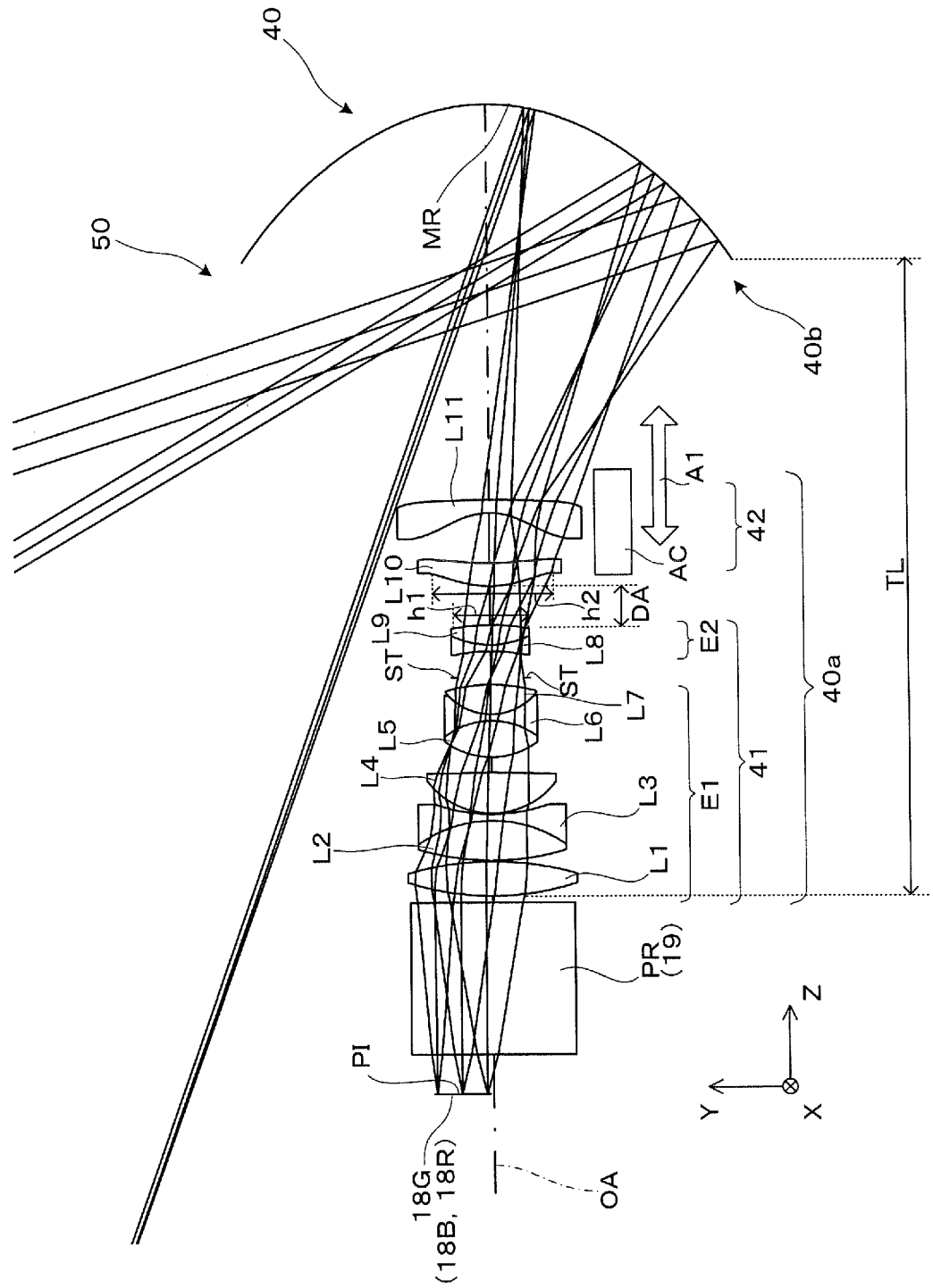
FIG. 3 is a partially enlarged view of the portion from the object plane to the concave reflection mirror in FIG. 2.

Further, in the projection system 40, the portion on the reduction side is a roughly telecentric system, as shown in FIGS. 2 and 3. Therefore, when the cross dichroic prism 19 combines the light fluxes modulated by the liquid crystal panels 18R, 18G, and 18B with one another to form image light, as described above, variation in the assembly of the cross dichroic prism 19 and the liquid crystal panels 18R, 18G, and 18B is unlikely to occur.

As described above, in the projection system 40 according to the present embodiment and the projector 2, which is a projection-type image display apparatus using the projection system 40, the projection system 40 includes the first optical group 40a, which forms an intermediate image, and the second optical group 40b, which enlarges and projects the intermediate image formed by the first optical group 40a, and the first optical group 40a and the second optical group 40b satisfy a variety of conditions, such as the ratio h2/h1 between the effective aperture diameters of lenses and Conditional Expression (1) described above. Therefore, first of all, in the case where the projection system 40 is incorporated in the projector 2, a satisfactorily displayed large screen is achieved in proximate projection. Further, in addition to the above, the overall length of the entire lens system of the projection system 40 can be reduced in a linear arrangement to achieve a compact configuration. That is, the entire optical system can have a compact configuration.

Second Embodiment

A projection system according to a second embodiment and a projection-type image display apparatus incorporating the projection system will be described below in detail with reference to FIG. 4 and other figures. The present embodiment is a variation of the first embodiment and is the same as the first embodiment except that the projection system includes an optical path reflector. Therefore, portions having the same functions as those in the first embodiment have the same names and reference characters and will not be described in detail. In particular, the illustration and description of the entire projection system are the same as those described with reference to FIGS. 1 and 2 and will therefore be omitted.

Figure 4:
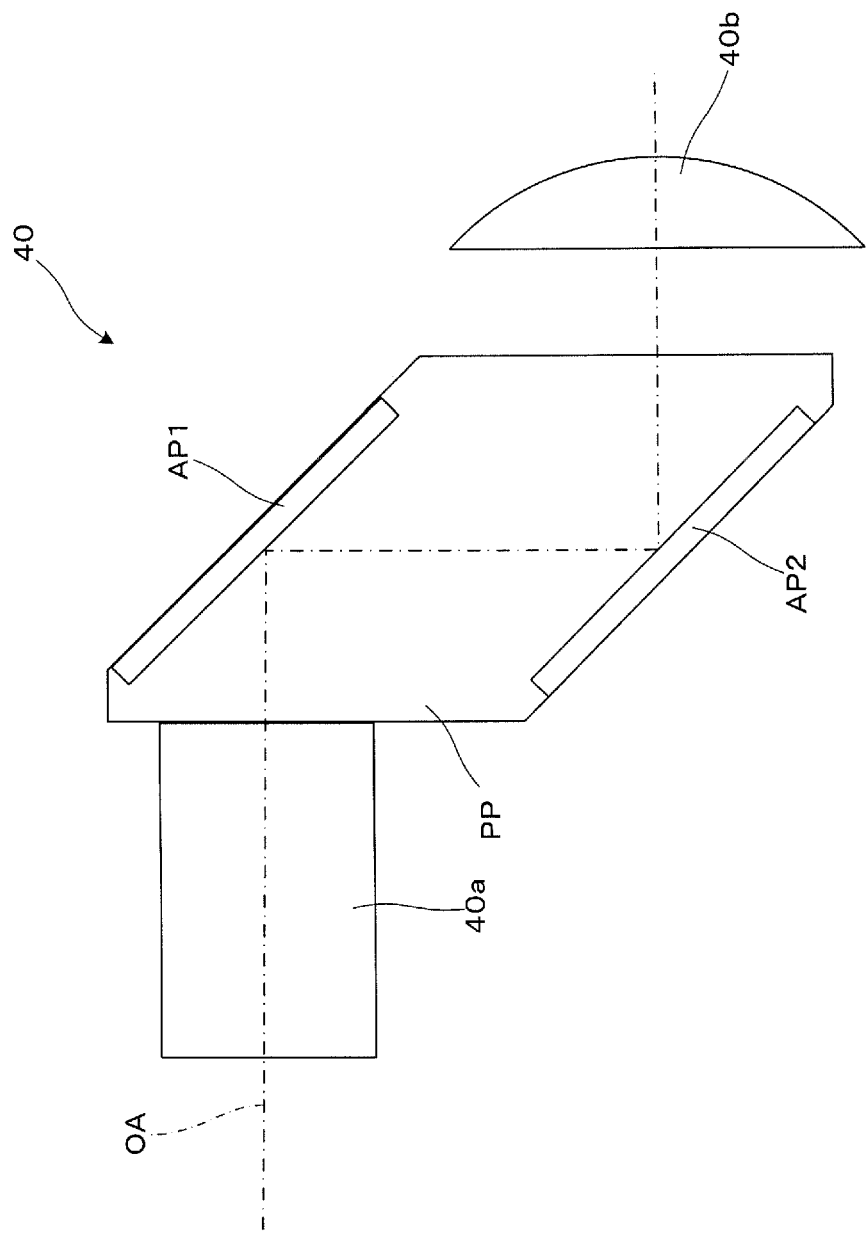
FIG. 4 is a plan view conceptually showing a projection system incorporated in a projector according to a second embodiment.
Figure 5:
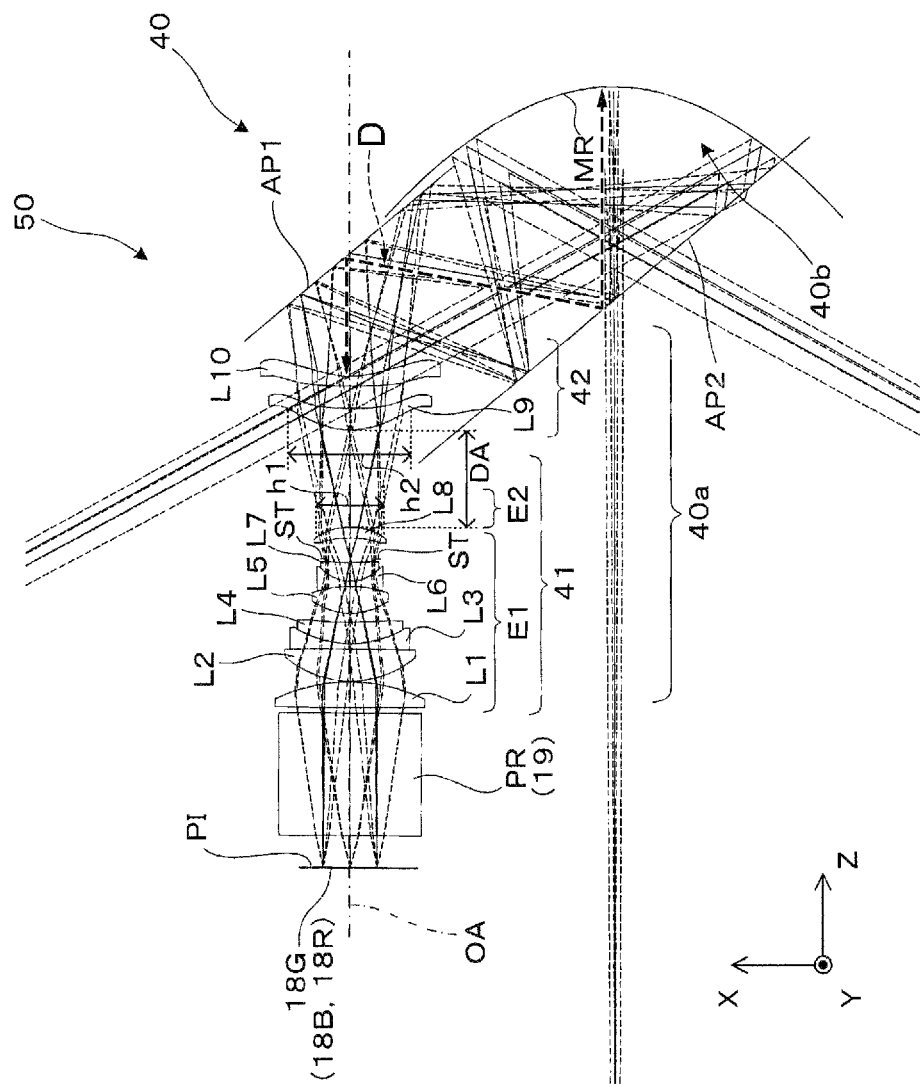
FIG. 5 is a partially enlarged view of a portion from the object plane to a concave reflection mirror in the projection system according to the second embodiment or Example 2.
Figure 6:
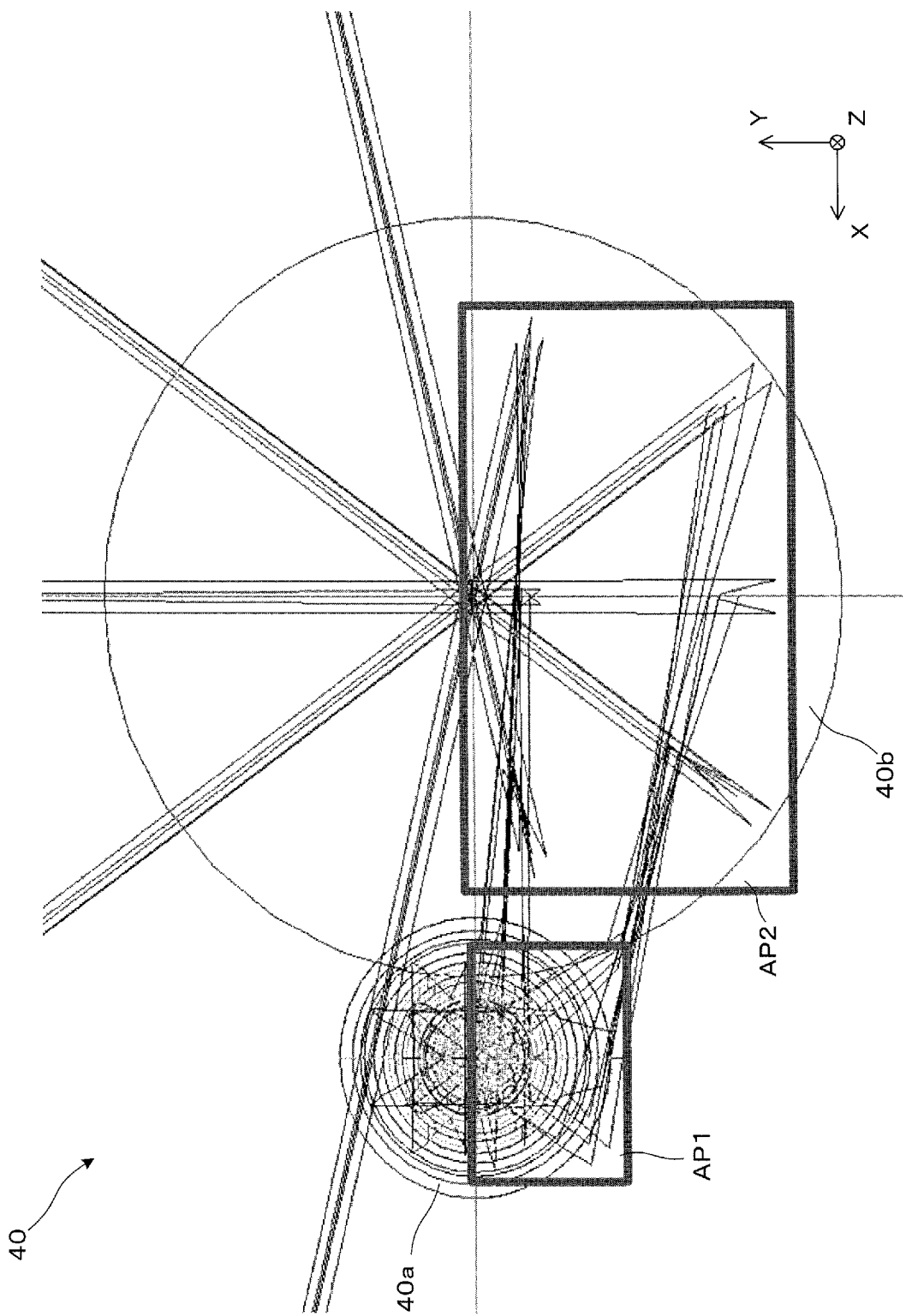
FIG. 6 is a rear view for showing the optical path in the projection system viewed in another direction.

FIG. 4 is a schematic plan view for conceptually describing the projection system used in a projection-type image display apparatus according to the present embodiment. The projection system includes an optical path deflector, as described above. FIG. 5 is a partially enlarged view of the portion from the object plane to the concave reflection mirror in the projector as a projection-type image display apparatus and correspond to FIG. 3. It is, however, noted that FIG. 5 differs from FIG. 3 in that FIG. 5 is viewed in another direction for ease of illustration of the folding operation of the optical path deflector. FIG. 6 is a rear view for showing the optical path in the projection system viewed in another direction. That is, FIG. 6 shows the projection system viewed from the side facing the image display device.

The projection system 40 according to the present embodiment differs from the projection system shown in the first embodiment by way of example in that at least one optical path deflector for deflecting the optical path is disposed between the first optical group 40a and the second optical group 40b and folds the optical path. The description in the embodiment will be made of an exemplary configuration shown in FIGS. 4 to 6 in which two optical path deflectors for deflecting the optical path, a first optical path deflector AP1 and a second optical path deflector AP2, are disposed between the first optical group 40a and the second optical group 40b.

The first embodiment has been described with reference to the aspect in which the projection system is formed of a small number of lenses to reduce the overall length of the projection system for reduction in size of the entire apparatus in the optical axis direction, whereas the present embodiment is characterized in that, contrary to the first embodiment, the size of the entire apparatus is reduced by increasing the overall length of the projection system 40, in particular, that is, by increasing the distance between the first optical group 40*a* and the second optical group 40*b* and deflecting the optical path of the projection system 40 with the aid of the first optical path deflector AP1 and the second optical path deflector AP2 disposed between the first optical group 40*a* and the second optical group 40*b*, as shown in FIG. 4 and other figures.

The projection system 40 according to the present embodiment will be specifically described below with reference to FIGS. 4, 5, and 6 and other figures. The projection system 40 shown by way of example in FIG. 5 and other figures has the same configuration as that of a projection system 40 according to Example 2, which will be described later.

In the embodiment, the projection system 40 includes not only the first optical group 40*a* and the second optical group 40*b*, which are each an optically functional primary section formed, for example, of a lens or a curved mirror, but the first optical path deflector AP1 and the second optical path deflector AP2, each of which is formed of a flat mirror having a reflection surface inclining with respect to the optical axis OA and folds the optical path, as shown in FIG. 4. That is, the first optical path deflector AP1 and the second optical path deflector AP2 are so paired as to form two reflection surfaces facing each other between the first optical group 40*a* and the second optical group 40*b* and deflect the optical path of the image light. The first optical path deflector AP1 and the second optical path deflector AP2 are positioned by a holder PP, which is molded integrally therewith, in such a way that the two optical path deflectors incline with respect to the optical axis OA by a specific angle and are fixed with the arrangement of the two optical path deflectors maintained, as shown in FIG. 4 by way of example. In the embodiment, the first optical path deflector AP1 is disposed on the upstream side in the optical path, and the second optical path deflector AP2 is disposed on the downstream side in the optical path, as shown in FIG. 4. Further, the first optical path deflector AP1 is positioned in the optical path on the upstream side of the position of the intermediate image formed by the first optical group 40*a*, whereas the second optical path deflector AP2 is positioned in the optical path on the downstream side of the position of the intermediate image, as shown in FIG. 5. Moreover, the first and second optical path deflectors AP1, AP2 are so disposed with the reflection surfaces inclining that the optical path is folded not only in the upward/downward direction, that is, the direction Y but in the rightward/leftward direction, that is, the direction X, as shown in FIGS. 4 to 6.

Specific examples of the configurations of the first optical group 40*a* and the second optical group 40*b*, which are each an optically functional primary section of the projection system 40, will be described below.

The projection system 40 includes a first optical group 40*a*, which is formed of a plurality of lenses and has positive power, and a second optical group 40*b*, which is formed of a single mirror MR having a reflection surface having a concave aspheric shape, with the first optical group 40*a* and the second optical group 40*b* sequentially arranged from a reduction side.

The first optical group 40*a* forms an intermediate image of an image display device disposed in the reduction-side conjugate position, which is conjugate with the intermediate image, and the second optical group 40*b* enlarges the intermediate image formed by the first optical group 40*a* and projects the enlarged intermediate image toward the surface to be irradiated with the image light, such as a screen, as in the first embodiment.

The first optical group 40*a* is formed of a first-first lens group 41, which is provided on the reduction side and has positive power, and a first-second lens group 42, which is provided on the enlargement side and has positive or negative power. The first optical group 40*a* is formed of ten lenses L1 to L10, with part of the lenses forming the first-first lens group 41 and the remainder forming the first-second lens group 42.

In the first optical group 40*a*, the boundary between the first-first lens group 41 and the first-second lens group 42 is specified as follows: The ratio h2/h1 between the effective aperture diameters h1 and h2 of lens surfaces of lenses separate from each other by an air space is set, and the air space where the ratio h2/h1 exceeds 1.2 for the first time is defined as the boundary. In the example shown in FIG. 5, an air space DA between the eighth lens L8 and the ninth lens L9 counted from the reduction-side is the boundary. That is, the effective aperture diameter h1 of the enlargement-side lens surface of the lens L8, which is the reduction-side lens surface in the air space DA, and the effective aperture diameter h2 of the reduction-side lens surface of the lens L9, which is the enlargement-side lens surface in the air space DA, satisfy the condition on the ratio described above.

The first-first lens group 41 has an aperture stop ST provided therein, and it is assumed in the description that the first-first lens group 41 is formed of a lens group E1 on the reduction side of the aperture stop ST and a lens group E2 on the enlargement side of the aperture stop ST. In the example shown in FIG. 5, the lens group E1 is formed of the lenses L1 to L7, and the lens group E2 is formed of the lens L8.

In the example shown in FIG. 5, the first-second lens group 42 is formed of two lenses, that is, the lenses L9 and L10. Out of the two lenses, the reduction-side lens L9 is a positive lens having a convex surface facing the enlargement side and having positive power. On the other hand, the enlargement-side lens L10 is a negative lens having negative power. The first-second lens group 42 has a plurality of aspheric lens surfaces.

The first-second lens group 42 moves in the optical axis direction when focusing is performed in association with a change in magnification. That is, when focusing is performed in association with a change in magnification, the first-second lens group 42 brings an image into focus by movement of at least one of the two lenses L9 and L10 with the aid of an actuator that is not shown in the optical axis direction, that is, direction along the optical axis OA.

Also in the present embodiment, Conditional Expressions (1) to (4) are satisfied, as in the first embodiment.

When f1/TL is smaller than the lower limit set by Conditional Expression (1), the focal length f1 of the first optical group 40*a* is too shorter than the distance TL, which is the overall length of the projection system 40, and it is therefore difficult for even the first optical group 40*a*, which has a small number of lenses, to satisfactorily correct the aberrations with a sufficiently long back focal length maintained. Further, when the focal length f1 of the first optical group 40*a* is too short, the light from the first optical group 40*a* diverges at a steep angle, and it is therefore difficult to increase the distance between the first optical group 40*a* and the second optical group 40b with the sizes of the second optical group 40b, which is a mirror, and other components maintained small.

When f1/TL is greater than the upper limit set by Conditional Expression (1), the focal length f1 of the first optical group 40a is too long, resulting in too a long distance from the first optical group 40a to the intermediate image. The size of the intermediate image increases accordingly, and the second optical group 40b therefore needs to be large. That is, the situation described above is not preferable from the viewpoint of size reduction.

Further, in the present embodiment, the projection system 40 satisfies $$0.1 < f1/D < 0.3 \qquad (5)$$

where D represents the size of the air space between the first optical group 40a and the second optical group 40b.

Conditional Expression (5) represents a condition on the ratio between the distance from the first optical group 40a to the intermediate image and the distance from the second optical group 40b to the intermediate image and allows the first and second optical path deflectors AP1, AP2, which are each an optical path deflector, to be efficiently disposed.

For example, in a case where two mirrors are disposed as the first and second optical path deflectors AP1, AP2, the first optical path deflector AP1 is disposed between the first optical group 40a and the intermediate image, and the second optical path deflector AP2 is disposed between the first optical path deflector AP1 and the second optical group 40b. In this case, when f1/D is smaller than the lower limit set by the Conditional Expression (5), the distance between the intermediate image and the second optical group 40b is too short, requiring the second optical path deflector AP2 to be disposed between the intermediate image and the first optical path deflector AP1. This arrangement is not preferable in terms of design. When f1/D is greater than the upper limit set by the Conditional Expression (5), the distance between the first optical group 40a and intermediate image is too short, and it is therefore difficult to ensure a sufficiently wide space for disposing the first and second optical path deflectors AP1, AP2.

In the projection system 40, the lenses that form the first optical group 40a will be described below sequentially from the reduction side, with reference to FIG. 5. First of all, in the first optical group 40a, the first-first lens group 41 and the first-second lens group 42 are formed of the ten lenses in total, as described above. In the first-first lens group 41, the reduction-side lens group E1 includes the lenses L1 to L7, and the enlargement-side lens group E2 includes the lens L8. The first-second lens group 42 includes the two lenses L9 and L10.

In the first-first lens group 41, the lens group E1, which is provided on the reduction side of the aperture stop ST, is so configured that the lenses L1, L2, L4, L5, and L7 are each a positive convex lens and the lenses L3 and L6 are each a negative concave lens. The lenses L2 and L3 form a doublet. The lens L4 is a positive meniscus lens having two aspheric surfaces on opposite sides. The lenses L5, L6, and L7 form a triplet.

In the first-first lens group 41, the lens group E2, which is provided on the enlargement side of the aperture stop ST, is so configured that the lens L8 is a positive meniscus lens having a convex surface facing the enlargement side.

The lenses L1 to L8 are made of glass and are each a spherical lens except the lens L4. The lenses L1 to L8 each have a circular shape axially symmetric with respect to the optical axis OA.

In the first-second lens group 42, the lens L9 is a positive meniscus lens having a convex surface facing the enlargement side, and the lens L10 is a negative meniscus lens having a concave surface in the vicinity of the optical axis. Each of the lenses L9 and L10 is an aspheric lens made of a resin, has two aspheric surfaces on opposite sides, and has a circular shape axially symmetric with respect to the optical axis OA.

As described above, the first optical group 40a is formed of the ten lenses (lenses L1 to L10) in total.

The second optical group 40b is formed of the single mirror MR axially symmetric with respect to the optical axis OA and having a concave aspheric shape, as described above. The mirror MR reflects video image light having exited out of the first optical group 40a toward the surface to be irradiated with the image light, such as a screen.

The lenses L1 to L10, which form the first optical group 40a, and the mirror MR, which forms the second optical group 40b, each have a shape axially symmetric with respect to the optical axis OA, as described above. That is, the lenses L1 to L10 and the reflection surface of the mirror MR are rotationally symmetric with respect to the common optical axis OA.

As described above, in the projection system 40 according to the present embodiment and the projector 2, which is a projection-type image display apparatus using the projection system 40, the projection system 40 includes the first optical group 40a, which forms an intermediate image, and the second optical group 40b, which enlarges and projects the intermediate image formed by the first optical group 40a, and the first optical group 40a and the second optical group 40b satisfy a variety of conditions, such as the ratio h2/h1 between the effective aperture diameters of lenses and Conditional Expression (1) described above. Therefore, first of all, in the case where the projection system 40 is incorporated in the projector 2, a satisfactorily displayed large screen is achieved in proximate projection. Further, in addition to the above, a compact projection system is achieved by increasing the distance between the first optical group 40a and the second optical group 40b and deflecting the optical path with the aid of the first and second optical path deflectors AP1, AP2, which deflect the optical path in the two directions, disposed at the middle of the optical path between the first and second optical groups. That is, the entire optical system can have a compact configuration.

In the configuration of the projection system shown in the first embodiment by way of example, it is conceivable to provide the optical path deflectors, as in the present embodiment. Conversely, in the configuration of the projection system shown in the present embodiment by way of example, it is conceivable to employ the aspect in which the overall length of the projection system is reduced, as in the first embodiment. That is, the projection system 40 can be so configured that the overall length of the entire lens system is reduced in a linear arrangement to achieve a compact configuration or can be so configured that the distance between the first optical group 40a and the second optical group 40b is increased and a member that deflects the optical path in the two directions is disposed at the middle of the optical path between the first and second optical groups.

Further, in the present embodiment, the two optical path deflectors AP1 and AP2 are provided between the first optical group 40a and the second optical group 40b with no other optical element provided therebetween to fold the optical path twice.

In the above description, the arrangement in which the two optical path deflectors AP1 and AP2 face each other allows, for example, the optical path of the first optical group 40a and the optical path of the second optical group 40b to be shifted in parallel to each other in the plan view. Therefore, for example, the first optical path deflector AP1 can deflect the optical axis OA of the image light having exited out of the first optical group 40a in such a way that the optical axis OA extends in the longitudinal direction of the screen, and the second optical path deflector AP2 can cause the optical axis OA deflected by the first optical path deflector AP1 to be oriented again in the direction in which the optical axis OA from the first projection system 40a extends.

Also in an optical system of related art, an attempt to fold the optical path twice has been made to reduce the size of an apparatus. In the related art, however, to fold the optical path twice, it is necessary to provide a relay optical system, an optical path deflection optical element, or any other component in an image formation lens system. In contrast, in the present application, the optical path deflectors AP1 and AP2 are provided in the space where the intermediate image is formed, whereby an effect on the performance and other factors of the projection system is smaller than in the case where the optical path deflectors are provided in an image formation lens system.

Further, for example, in a typical compact projector, an optical engine formed, for example, of a power supply and a light source is disposed at a single location and occupies at least half the main body footprint. The projection system is therefore so disposed along an end of the enclosure in many cases as not to interfere with the optical engine, resulting in a laterally asymmetric configuration. In contrast, applying the configuration of the present application to the projection system, in which the optical path is deflected, allows a light exiting section of the projection system is disposed at the center of the enclosure of the projector.

Further, in a mirror-based projection system using a mirror disposed on the downstream side along the optical path, such as the second optical group 40b in the present application, in general, part of the mirror undesirably protrudes in many cases, and the light exiting section is close to the optical axis, which undesirably require part of the enclosure to be cut or part of the mirror axially symmetric with respect to the optical axis to be cut. In contrast, in the present embodiment, causing the two optical path deflectors AP1 and AP2 facing each other to incline with respect to the optical axis OA allows the mirror portion, that is, the second optical group 40b to be shifted. As a result, for example, the bottom portion of the mirror does not protrude, and the light exiting section can be moved to a position separate from the first optical group 40a. The overall thickness of the apparatus can further be reduced.

Further, in a linearly arranged optical system using a concave mirror in a position closest to the enlargement side, to lower the final position of an image on the screen, the optical path reflected off the concave mirror interferes with the focusing group disposed on the enlargement side in the refractive optical system in some cases. In this case, part of a lens of the focusing group needs to be cut, which prevents use of a typical cylindrical lens barrel, and a specially-shaped lens barrel needs to be used. In contrast, the configuration described above, in which the optical path deflectors AP1 and AP2 deflect the optical axis to change the height of the optical axis of the second optical group 40b, which is closest to the enlargement side, to a height different from the height of the optical axis of the first optical group 40a, which forms a refractive optical system, can prevent the interference of the optical path with the enlargement-side lens of the first optical group 40a. A typical cylindrical lens barrel can therefore be used with the first optical group 40a.

EXAMPLES

Specific examples of the projection system 40 will be described below. The meanings of a variety of parameters common to Examples 1 to 6, which will be described below, are summarized below.
f: Focal length of entire optical system
ω: Half angle of view
FNo: F-Number
R: Radius of curvature
D: On-axis inter-surface space (thickness of lens or space between lenses)
Nd: Refractive index at d line
vd: Abbe number at d line
H: Effective aperture radius
An aspheric surface is expressed by the following polynomial (expression of aspheric surface).
Even-Number High-Order Aspheric Surface:

$$z = \frac{ch^2}{1 + \sqrt{1-(k+1)c^2h^2}} + A04 \cdot h^4 + A06 \cdot h^6 + A08 \cdot h^8 + A10 \cdot h^{10} + A12 \cdot h^{12} + A14 \cdot h^{14}$$

Odd-Number High-Order Aspheric Surface:

$$z = \frac{ch^2}{1 + \sqrt{1-(k+1)c^2h^2}} + A04 \cdot h^3 + A06 \cdot h^4 + A08 \cdot h^5 + A10 \cdot h^6 + A12 \cdot h^7 + A14 \cdot h^8 + A04 \cdot h^9 + A06 \cdot h^{10} + A08 \cdot h^{11} + A10 \cdot h^{12} + A12 \cdot h^{13} + A14 \cdot h^{14}$$

The parameters in the polynomial are as follows.
c: Curvature (1/R)
h: Height from optical axis
k: Conic coefficient of aspheric surface
Ai: Higher-order aspheric coefficient of aspheric surface
OBJ stands for a panel surface PI. STO stands for the aperture stop ST. IMG stands for the image plane (projection plane) on the screen. A surface labeled with a surface number followed by "*" or "**" is a surface having an aspheric shape, with "*" representing an even-number high-order aspheric surface and "**" representing an odd-number high-order aspheric surface.

Example 1

Table 1 shown below shows data on the lens surfaces in Example 1.

TABLE 1

F 2.83
FNo 2.00
ω 71.8

| Surface number | R | D | Nd | Vd | H |
|---|---|---|---|---|---|
| OBJ | Infinity | 6.060 | | | |
| 1 | Infinity | 22.920 | 1.51633 | 64.1 | |
| 2 | Infinity | 1.000 | | | |

TABLE 1-continued

F 2.83
FNo 2.00
ω 71.8

| Surface number | R | D | Nd | Vd | H |
|---|---|---|---|---|---|
| 3 | 41.478 | 5.195 | 1.92286 | 20.9 | 11.65 |
| 4 | −44.377 | 0.150 | | | 11.51 |
| 5 | 38.163 | 6.000 | 1.49700 | 81.5 | 10.12 |
| 6 | −18.859 | 1.000 | 1.92286 | 20.9 | 9.25 |
| 7 | 25.459 | 0.150 | | | 8.59 |
| *8 | 12.500 | 6.166 | 1.49700 | 81.5 | 8.78 |
| *9 | −100.333 | 2.294 | | | 8.15 |
| 10 | 11.483 | 5.500 | 1.48749 | 70.2 | 6.20 |
| 11 | −11.328 | 1.000 | 2.00100 | 29.1 | 5.52 |
| 12 | 8.663 | 4.500 | 1.92286 | 20.9 | 5.30 |
| 13 | −24.491 | 1.051 | | | 5.24 |
| STO | Infinity | 4.000 | | | 4.87 |
| 15 | −24.932 | 1.000 | 2.00100 | 29.1 | 4.74 |
| 16 | 13.443 | 3.000 | 1.84666 | 23.8 | 4.98 |
| 17 | −30.427 | d17 | | | 5.20 |
| *18 | 14.320 | 3.500 | 1.53116 | 56.0 | 9.30 |
| *19 | 34.843 | d19 | | | 9.84 |
| *20 | −9.588 | 2.000 | 1.53116 | 56.0 | 11.07 |
| *21 | −101.953 | d21 | | | 12.75 |
| *22 | −29.990 | d22 | Reflection surface | | |
| IMG | Infinity | | | | |

In Table 1 shown above and the following tables, 10 raised to some power ($1.00 \times 10^{+18}$, for example) is expressed by using E (1.00 E+18, for example).

Table 2 shown below shows aspheric coefficients of the lens surfaces in Example 1.

TABLE 2

Even-ordered Aspheric coefficient

| | Surface number | | | |
|---|---|---|---|---|
| | 8 | 9 | 18 | 19 |
| K | 0.00000 | 0.00000 | 0.00000 | 0.00000 |
| A04 | 2.6279E−05 | 4.8641E−05 | −2.2504E−04 | −2.3357E−04 |
| A06 | 7.5019E−08 | −1.6686E−08 | 1.7238E−06 | 2.9542E−06 |
| A08 | 1.8515E−10 | −1.7012E−09 | −1.5666E−08 | −1.5173E−08 |
| A10 | 0.0000E+00 | 0.0000E+00 | 0.0000E+00 | 0.0000E+00 |
| A12 | 0.0000E+00 | 0.0000E+00 | 0.0000E+00 | 0.0000E+00 |
| A14 | 0.0000E+00 | 0.0000E+00 | 0.0000E+00 | 0.0000E+00 |

| | Surface number | | |
|---|---|---|---|
| | 20 | 21 | 22 |
| K | −0.52745 | 0.00000 | −0.60293 |
| A04 | 1.5923E−04 | 4.8134E−05 | 3.0133E−06 |
| A06 | 1.5304E−06 | −4.5729E−07 | −1.7929E−09 |
| A08 | −4.5527E−09 | 1.9175E−09 | 1.6901E−12 |
| A10 | 0.0000E+00 | −5.4530E−12 | −7.3894E−16 |
| A12 | 0.0000E+00 | 0.0000E+00 | 3.3042E−20 |
| A14 | 0.0000E+00 | 0.0000E+00 | 6.1366E−23 |

Table 3 shown below shows the values of the variable spaces d17, d19, d21, and d22 in Table 1 in a case where the projection distance is changed.

TABLE 3

| | Variable space | | | |
|---|---|---|---|---|
| Projection distance | Reference distance | Short distance | Long distance |
| d17 | 5.808 | 5.652 | 5.946 |
| d19 | 7.587 | 7.614 | 7.552 |
| d21 | 60.119 | 60.247 | 60.016 |
| d22 | −376.756 | −305.590 | −503.072 |

Figure 7:
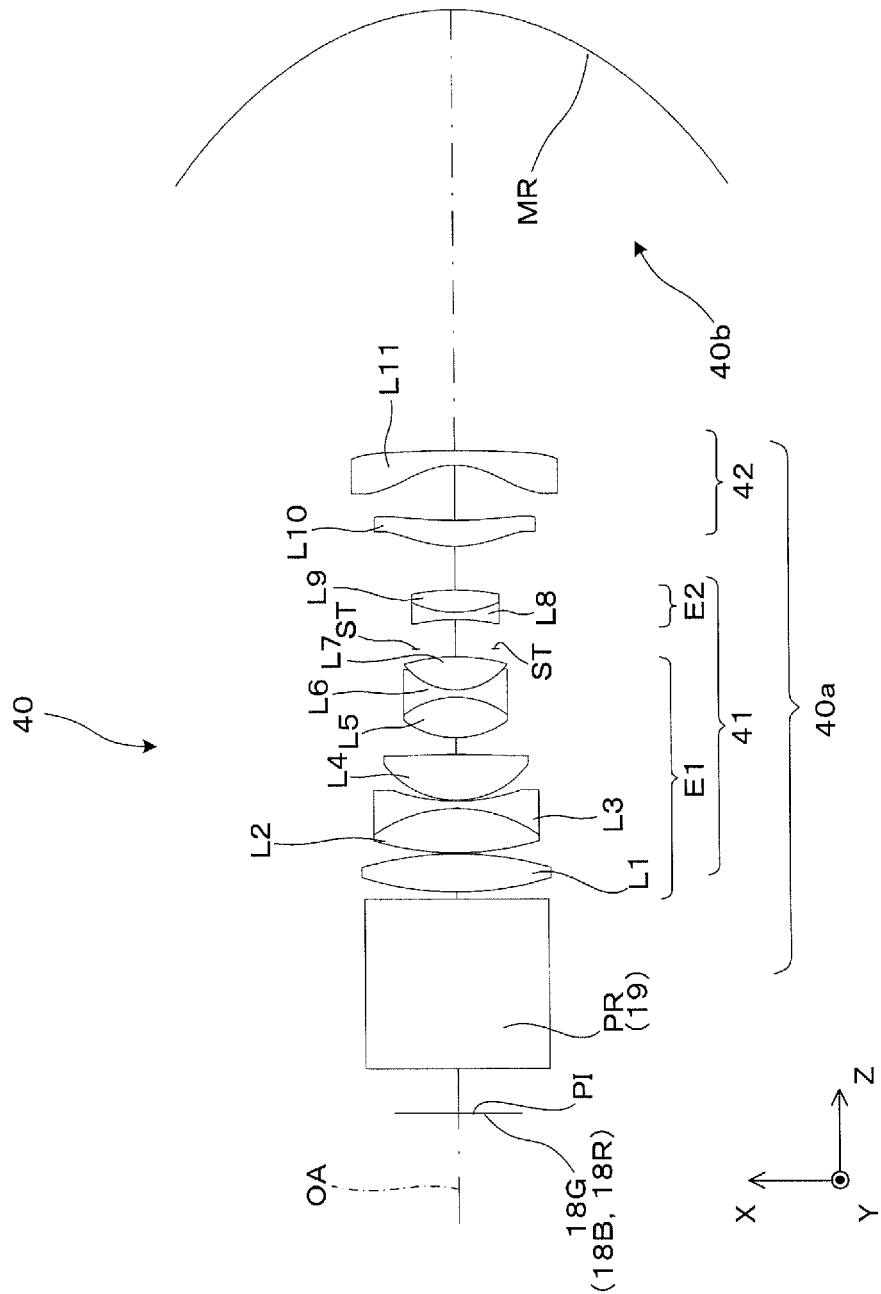
FIG. 7 shows the configuration of a projection system according to Example 1.

FIG. 7 is a cross-sectional view of the projection system according to Example 1. The projection system shown in FIG. 7 corresponds to the projection system 40 according to the first embodiment. In FIG. 7, the projection system 40 enlarges and projects an image on the panel surface PI at the magnification according to the distance to the screen. The first optical group 40a of the projection system 40 includes the eleven lenses L1 to L11, the lenses L1 to L7, which form the lens group E1 of the first-first lens group 41, the lenses L8 and L9, which form the lens group E2 of the first-first lens group 41, and the lenses L10 and L11, which form the first-second lens group 42, sequentially arranged from the reduction side. The magnification is changed when the projection position is changed (projection distance is changed), for example, in a case where projection to a wall surface is changed to projection to a floor surface. When focusing is performed in association with a change in magnification, as described above, the first-first lens group 41 remains fixed, whereas the first-second lens group 42 is moved. That is, in the first-second lens group 42, the two lenses L10 and L11 are moved independently of each other when the magnification is changed to bring an image into focus.

The lenses L1 to L11 and other components have been described in detail with reference to FIG. 3 and are summarized below. The first optical group 40a is formed of the following eleven lenses sequentially arranged from the reduction side: the positive biconvex first lens L1; the doublet of the positive biconvex second lens L2 and the negative biconcave third lens L3; the positive biconvex fourth lens L4 having aspheric surfaces on opposite sides; the triplet of the positive biconvex fifth lens L5, the negative biconcave sixth lens L6, and the positive biconvex seventh lens L7; the doublet of the negative biconcave eighth lens L8 and the positive biconvex ninth lens L9; the positive tenth lens L10 having a meniscus shape having a convex surface facing the reduction side and having aspheric surfaces on opposite sides; and the negative eleventh lens L11 having a meniscus shape having a convex surface facing the enlargement side and having aspheric surfaces on opposite sides. Specific data on each of the lenses, such as the curvature, are shown in Table 1 described above.

Out of the lenses described above, the effective aperture diameter ratio exceeds 1.2 for the first time between the ninth lens L9 and the tenth lens L10. The mirror MR is formed of a single aspheric mirror having a concave shape.

Figure 8:
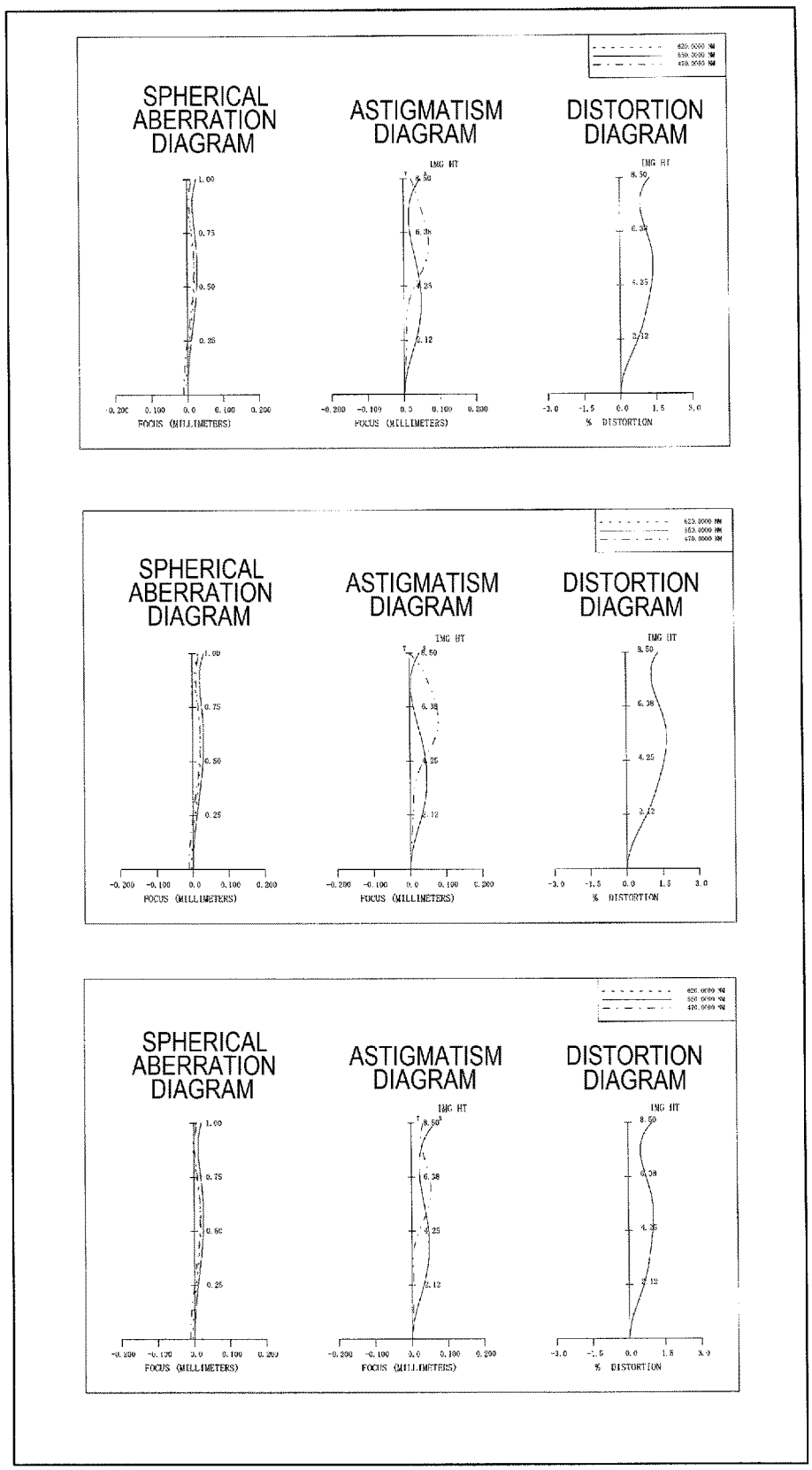
FIG. 8 shows reduction-side aberrations produced by the projection system according to Example 1.

FIG. 8 shows reduction-side aberrations (spherical aberration, astigmatism, and distortion) produced by the projection system when the projection magnification is changed. The upper portion, the middle portion, and the lower portion in FIG. 8 correspond to reduction-side aberrations at a reference distance, a short distance, and a long distance in Table 3, respectively.

Example 2

Table 4 shown below shows data on the lens surfaces in Example 2.

TABLE 4

F 2.84
FNo 2.00
ω 71.9

| Surface number | R | D | Nd | Vd | H Eccentricity (rotation) |
|---|---|---|---|---|---|
| OBJ | Infinity | 6.060 | | | |
| 1 | Infinity | 22.920 | 1.51633 | 64.1 | |
| 2 | Infinity | 1.000 | | | |
| 3 | 826.547 | 4.793 | 1.92286 | 20.9 | 12.70 |
| 4 | −32.098 | 0.150 | | | 12.87 |
| 5 | 18.689 | 6.000 | 1.75700 | 47.8 | 11.20 |
| 6 | −753.540 | 1.000 | 1.92286 | 20.9 | 10.21 |
| 7 | 19.533 | 4.000 | 1.51633 | 64.1 | 8.92 |
| 8 | 92.555 | 1.669 | | | 8.10 |
| 9 | 12.438 | 5.000 | 1.48749 | 70.2 | 6.40 |
| 10 | −20.781 | 1.000 | 2.00100 | 29.1 | 5.44 |
| 11 | 7.530 | 3.500 | 1.53172 | 48.8 | 4.78 |
| 12 | 90.116 | 0.626 | | | 4.77 |
| STO | Infinity | 4.000 | | | 4.77 |
| *14 | −18.968 | 2.000 | 1.92286 | 20.9 | 5.62 |
| *15 | −12.388 | d15 | | | 6.02 |
| *16 | 15.653 | 4.034 | 1.53116 | 56.0 | 13.55 |
| *17 | 84.941 | d17 | | | 14.04 |
| *18 | −5291.749 | 1.800 | 1.53116 | 56.0 | 14.97 |
| *19 | 17.902 | d19 | | | 15.63 |
| *20 | −32.630 | d20 | Reflection surface | | |
| IMG | Infinity | | | | |

Table 5 shown below shows aspheric coefficients of the lens surfaces in Example 2.

TABLE 5

Even-ordered Aspheric coefficient

| | Surface number | | | |
|---|---|---|---|---|
| | 14 | 15 | 16 | 17 |
| K | 2.33407 | 1.23752 | 0.00000 | 0.00000 |
| A04 | −4.4759E−05 | −2.2674E−05 | −4.6664E−05 | 1.1546E−04 |
| A06 | 0.0000E+00 | 1.0675E−07 | 2.7283E−07 | 3.4973E−07 |
| A08 | 0.0000E+00 | 6.8553E−09 | −3.5462E−09 | −6.3042E−09 |
| A10 | 0.0000E+00 | 0.0000E+00 | 2.5965E−12 | 1.2651E−11 |
| A12 | 0.0000E+00 | 0.0000E+00 | 0.0000E+00 | 0.0000E+00 |
| A14 | 0.0000E+00 | 0.0000E+00 | 0.0000E+00 | 0.0000E+00 |

| | Surface number | | |
|---|---|---|---|
| | 18 | 19 | 20 |
| K | −89.0000 | −0.14237 | −0.80452 |
| A04 | 8.4106E−05 | −1.2854E−04 | 3.5649E−06 |
| A06 | −2.0060E−07 | 4.2684E−07 | −2.6410E−09 |
| A08 | 6.7402E−10 | −1.1337E−09 | 2.3227E−12 |
| A10 | −3.3643E−12 | −2.2743E−13 | −1.4153E−15 |
| A12 | 0.0000E+00 | 0.0000E+00 | 4.8696E−19 |
| A14 | 0.0000E+00 | 0.0000E+00 | −6.9656E−23 |

Table 6 shown below shows the values of the variable spaces d15, d17, d19, and d20 in Table 4 in a case where the projection distance is changed.

TABLE 6

Variable space

| Projection distance | Reference distance | Short distance | Long distance |
|---|---|---|---|
| d15 | 18.194 | 17.835 | 18.556 |
| d17 | 4.252 | 4.249 | 4.260 |

TABLE 6-continued

Variable space

| Projection distance | Reference distance | Short distance | Long distance |
|---|---|---|---|
| d19 | 113.000 | 113.363 | 112.631 |
| d20 | −376.756 | −305.433 | −503.842 |

Table 7 shown below shows data on the first and second optical path deflectors AP1, APP2, which are each a folding surface that folds the optical path, and the mirror MR, that is, the second optical group 40b. Rotation f represents the inclination of each of the reflection surfaces with respect to the orientation of the optical axis OA extending from the first optical group 40a. The projection distance is assumed to be the reference distance.

TABLE 7

Data on folding surface

| Surface number | R | D | Rotation β | |
|---|---|---|---|---|
| *19 | 17.902 | 23.000 | 0.0 | |
| 19-1 | Infinity | 0.000 | −40.0 | Reflection surface |
| 19-2 | Infinity | −50.000 | −40.0 | |
| 19-3 | Infinity | 0.000 | 40.0 | Reflection surface |
| 19-4 | Infinity | 40.000 | 40.0 | |
| *20 | −32.630 | −376.756 | 0.0 | Reflection surface |

Figure 9:
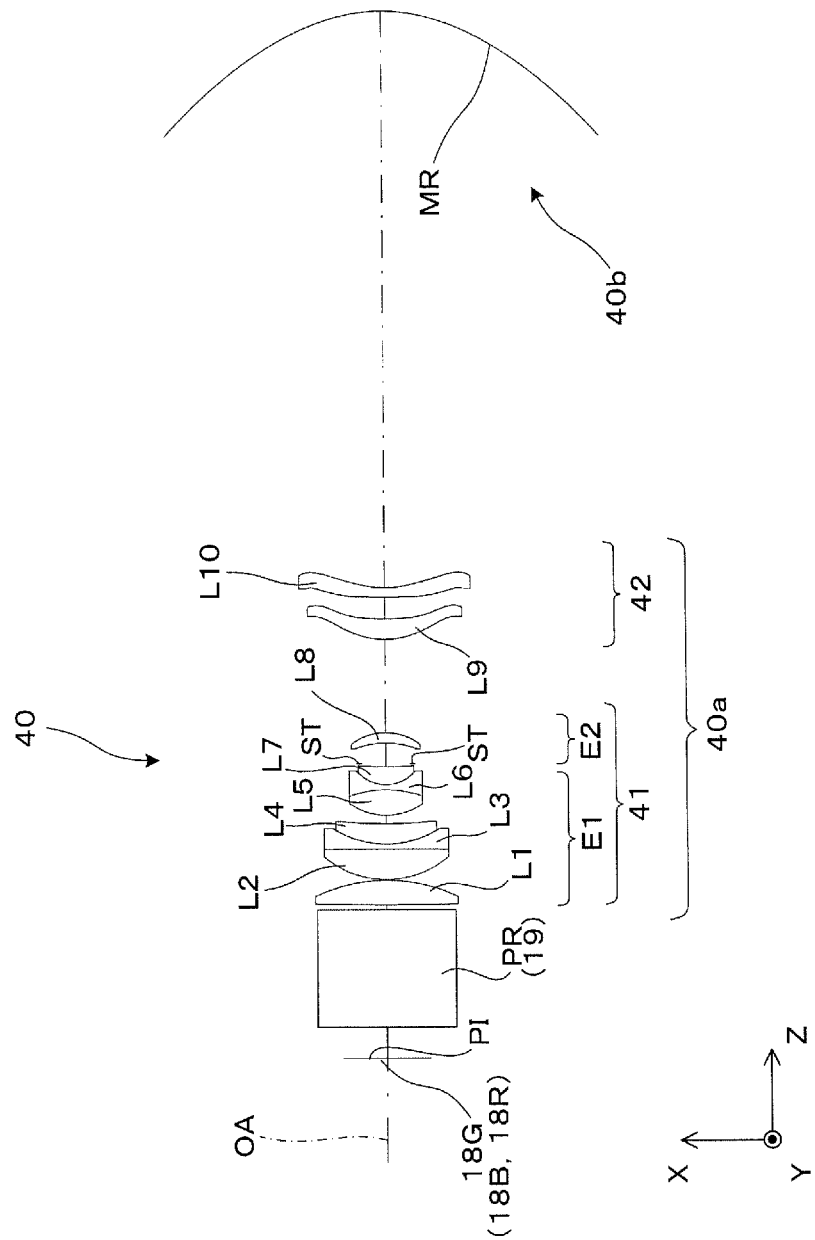
FIG. 9 shows the configuration of a projection system according to Example 2.

FIG. 9 is a cross-sectional view of the projection system according to Example 2. The projection system shown in FIG. 9 corresponds to the projection system 40 according to the second embodiment. In FIG. 9, the first and second optical path deflectors AP1, AP2, which each only fold the optical path but have no power, are omitted, and the folding operation of the two optical path deflectors is drawn in the form of a development. In FIG. 9, the projection system 40 enlarges and projects an image on the panel surface PI at the magnification according to the distance to the screen. The first optical group 40a of the projection system 40 includes the ten lenses L1 to L10, the lenses L1 to L7, which form the lens group E1 of the first-first lens group 41, the lens L8, which forms the lens group E2 of the first-first lens group 41, and the lenses L9 and L10, which form the first-second lens group 42, sequentially arranged from the reduction side.

The lenses L1 to L10 and other components have been described in detail with reference to FIG. 5 and are summarized below. The first optical group 40a is formed of the following ten lenses sequentially arranged from the reduction side: the positive biconvex first lens L1; the triplet of the positive biconvex second lens L2, the negative biconcave third lens L3, and the positive fourth lens L4 having a meniscus shape having a convex surface facing the reduction side; the triplet of the positive biconvex fifth lens L5, the negative biconcave sixth lens L6, and the positive seventh lens L7 having a meniscus shape having a convex surface facing the reduction side; the positive eighth lens L8 having a meniscus shape having a convex surface facing the enlargement side and having aspheric surfaces on opposite sides; the positive ninth lens L9 having a convex surface facing the reduction side and having aspheric surfaces on opposite sides; and the negative tenth lens L10 having a biconcave shape in the vicinity of the optical axis and having aspheric surfaces on opposite sides. Specific data on each of the lenses, such as the curvature, are shown in Table 4 described above.

Out of the lenses described above, the effective aperture diameter ratio exceeds 1.2 for the first time between the eighth lens L8 and the ninth lens L9. The mirror MR is formed of a single aspheric mirror having a concave shape.

Figure 10:
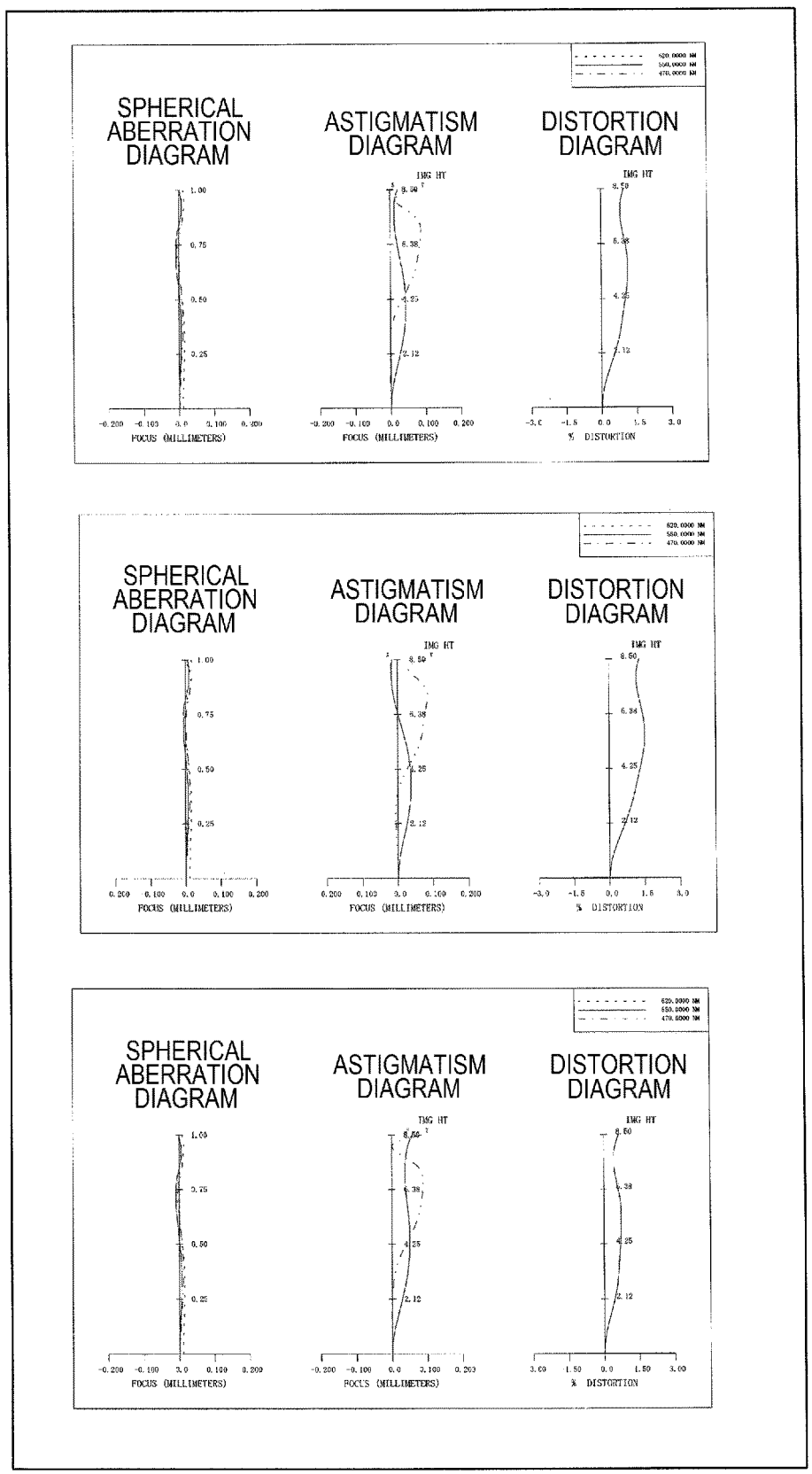
FIG. 10 shows reduction-side aberrations produced by the projection system according to Example 2.

FIG. 10 shows reduction-side aberrations (spherical aberration, astigmatism, and distortion) produced by the projection system when the projection magnification is changed. The upper portion, the middle portion, and the lower portion in FIG. 10 correspond to reduction-side aberrations at the reference distance, the short distance, and the long distance in Table 6, respectively.

In Example 2, the tenth lens L10 and the mirror MR are separate from each other by a very large distance. The large distance allows the optical path deflectors, which are portions the deflect the optical path, to be disposed between the tenth lens L10 and the mirror MR. The configuration described above allows the size of the projection system in the optical path direction to be reduced as compared, for example, with a case where the optical path is not folded but the components that form the projection system are linearly arranged and further allows the final light flux exiting position to be disposed at the center of the enclosure irrespective of the position of the lens groups in the enclosure, the right side or the left side. Further, the exterior appearance of the apparatus is advantageously designed.

Further, for example, a configuration in which the optical path deflectors deflect the optical axis in such a way that the optical axis inclines with respect to the vertical or horizontal axis of the image display device allows the light flux exiting position to be separate from the optical axis, and the light-exiting-side bottom portion of the mirror can be closer to the optical axis, whereby the thickness of the entire apparatus can be reduced.

Example 3

Table 8 shown below shows data on the lens surfaces in Example 3. In the present example and Example 4, which will be described later, the first optical group 40a is simplified as compared with that in Example 1 with the compact shape in Example 1 maintained. The 9-lens configuration of the first-first lens group 41 of the first optical group 40a in Example 1 is changed to a seven-lens configuration in Example 3 and a six-lens configuration in Example 4. The first-second lens group 42 has the two-lens configuration.

TABLE 8

F 2.81
FNo 2.00
ω 72.1

| Surface number | R | D | Nd | Vd | H |
|---|---|---|---|---|---|
| OBJ | Infinity | 6.060 | | | |
| 1 | Infinity | 22.920 | 1.51633 | 64.1 | |
| 2 | Infinity | 1.000 | | | |
| *3 | 35.000 | 4.967 | 1.72903 | 54.0 | 10.51 |
| *4 | −48.571 | 0.150 | | | 10.04 |
| 5 | 19.653 | 4.500 | 1.49700 | 81.5 | 8.97 |
| 6 | −245.467 | 0.100 | | | 8.03 |
| 7 | 158.455 | 1.686 | 2.00069 | 25.5 | 7.71 |
| 8 | 34.653 | 0.100 | | | 6.93 |
| 9 | 15.357 | 5.000 | 1.57099 | 50.8 | 6.50 |
| 10 | −13.107 | 1.200 | 2.00100 | 29.1 | 5.91 |
| 11 | 969.127 | 6.299 | | | 5.68 |

TABLE 8-continued

F 2.81
FNo 2.00
ω 72.1

| Surface number | R | D | Nd | Vd | H |
|---|---|---|---|---|---|
| STO | Infinity | 3.000 | | | 4.72 |
| 13 | 605.915 | 1.000 | 2.00100 | 29.1 | 4.99 |
| 14 | 12.975 | 3.000 | 1.84666 | 23.8 | 5.07 |
| 15 | −36.800 | d15 | | | 5.20 |
| *16 | 15.167 | 3.500 | 1.53116 | 56.0 | 10.02 |
| *17 | 27.732 | d17 | | | 10.80 |
| *18 | −11.886 | 2.000 | 1.53116 | 56.0 | 11.08 |
| *19 | 207.359 | d19 | | | 13.21 |
| *20 | −31.891 | d20 | Reflection surface | | |
| IMG | Infinity | 0 | | | |

Table 9 shown below shows aspheric coefficients of the lens surfaces in Example 3.

TABLE 9

Even-ordered Aspheric coefficient

| | Surface number | | | |
|---|---|---|---|---|
| | 3 | 4 | 16 | 17 |
| K | 0.00000 | 0.00000 | 0.00000 | 0.00000 |
| A04 | 7.2822E−05 | 5.6369E−05 | −1.6403E−04 | −2.0601E−04 |
| A06 | 7.0327E−08 | 1.6600E−07 | 1.1653E−06 | 2.1175E−06 |
| A08 | −8.5854E−10 | −1.6173E−09 | −1.2931E−08 | −9.7774E−09 |
| A10 | 4.5881E−12 | 4.7174E−12 | 0.0000E+00 | 0.0000E+00 |
| A12 | 0.0000E+00 | 0.0000E+00 | 0.0000E+00 | 0.0000E+00 |
| A14 | 0.0000E+00 | 0.0000E+00 | 0.0000E+00 | 0.0000E+00 |

| | Surface number | | |
|---|---|---|---|
| | 18 | 19 | 20 |
| K | −0.36623 | 0.00000 | −0.76477 |
| A04 | 6.0490E−05 | 6.0573E−06 | 2.6087E−06 |
| A06 | 7.8490E−07 | −2.7606E−07 | −2.1636E−09 |
| A08 | 4.1586E−09 | 1.4009E−09 | 1.7707E−12 |
| A10 | 2.5469E−11 | −3.8783E−12 | −9.2004E−16 |
| A12 | −3.8495E−13 | −1.1434E−14 | 2.3075E−19 |
| A14 | 0.0000E+00 | 0.0000E+00 | −2.2054E−23 |

Table 10 shown below shows the values of the variable spaces d15, d17, d19, and d20 in Table 8 in a case where the projection distance is changed.

TABLE 10

| | Variable space | | | |
|---|---|---|---|---|
| Projection distance | Reference distance | Short distance | Long distance |
| d15 | 8.604 | 8.400 | 8.797 |
| d17 | 5.086 | 5.134 | 5.036 |
| d19 | 69.827 | 69.983 | 69.684 |
| d20 | −376.756 | −306.717 | −501.359 |

Figure 11:
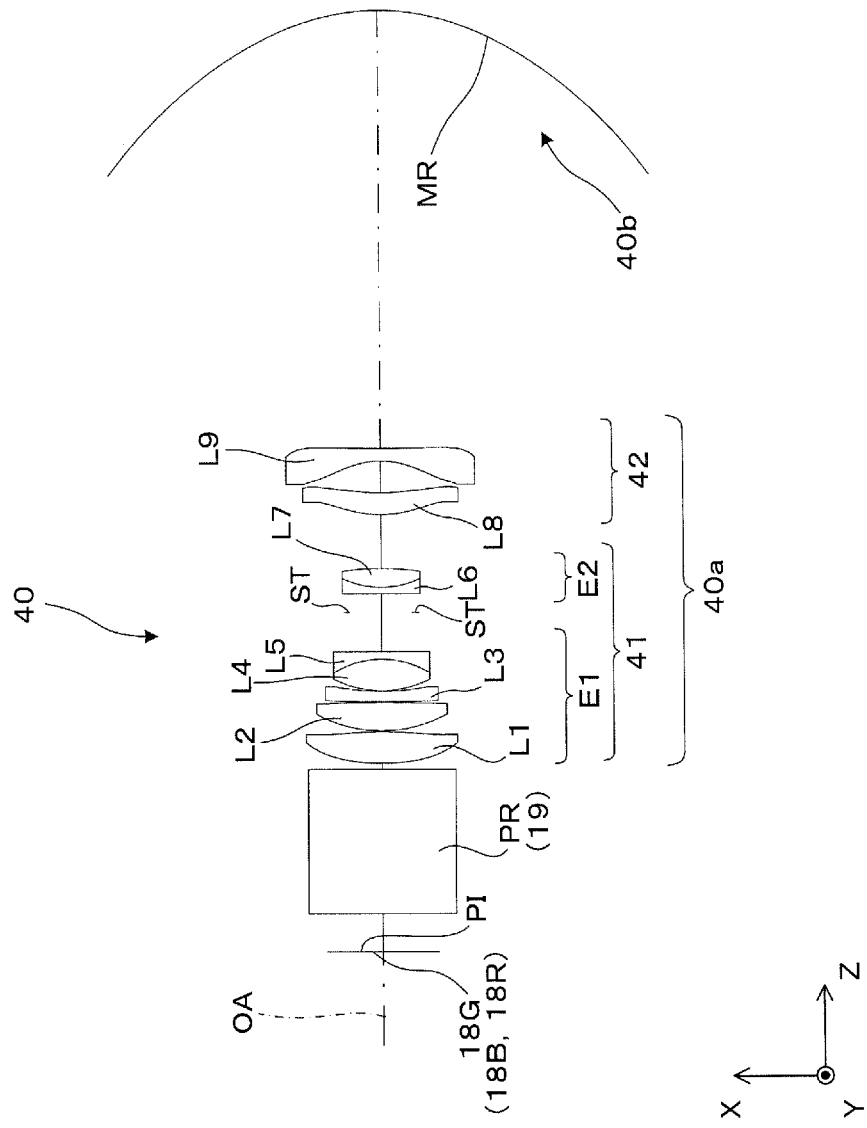
FIG. 11 shows the configuration of a projection system according to Example 3.

FIG. 11 is a cross-sectional view of the projection system according to Example 3. In Example 3, the first optical group 40a is formed of the following nine lenses: the positive biconvex first lens L1 having aspheric surfaces on opposite sides; the positive biconvex second lens L2; the negative third lens L3 having a meniscus shape having a convex surface facing the reduction side; the doublet of the positive biconvex fourth lens L4 and the negative biconcave fifth lens L5; the doublet of the negative sixth lens L6 having a meniscus shape having a convex surface facing the reduction side and the positive biconvex seventh lens L7; the positive eighth lens L8 having a meniscus shape having a convex surface facing the reduction side and having aspheric surfaces on opposite sides; and the negative biconcave ninth lens L9 having aspheric surfaces on opposite sides.

Out of the lenses described above, the effective aperture diameter ratio exceeds 1.2 for the first time between the seventh lens L7 and the eighth lens L8. That is, the first-first lens group 41 is formed of the lenses L1 to L7, and the first-second lens group 42 is formed of the lenses L8 and L9. The aperture stop ST is positioned between the fifth lens L5 and the sixth lens L6. That is, in the first-first lens group 41, the lens group E1 is formed of the lenses L1 to L5, and the lens group E2 is formed of the lenses L6 and L7. The mirror MR, which forms the second optical group 40b, is formed of a single aspheric mirror having a concave shape.

In Example 3 described above, lenses made of high-refractive-index glass having a refractive index of about 2 are disposed at appropriate locations to reduce the number of constituent lenses by two as compared with the number in Example 1 with the same performance as that in Example 1 maintained.

Figure 12:
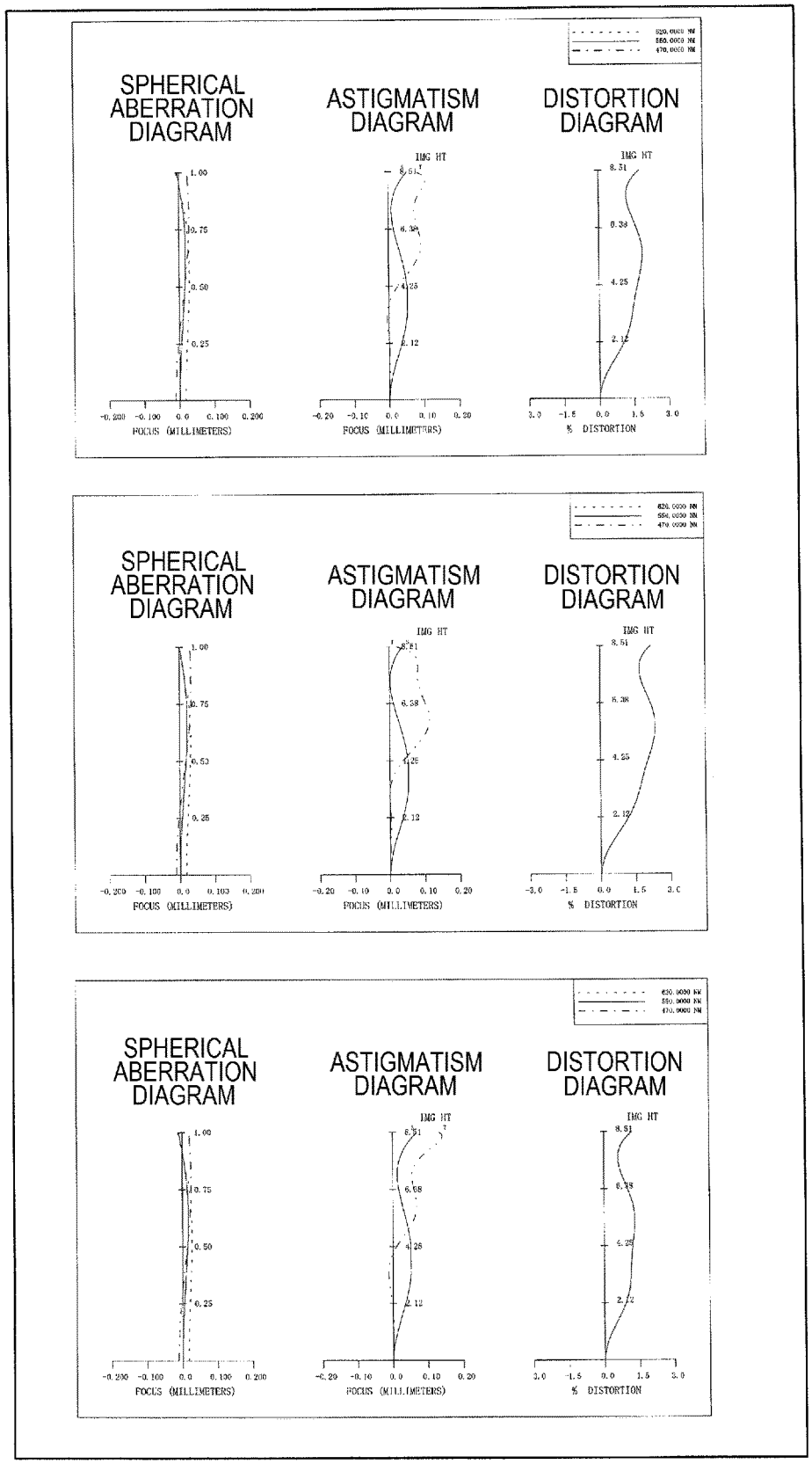
FIG. 12 shows reduction-side aberrations produced by the projection system according to Example 3.

FIG. 12 shows reduction-side aberrations (spherical aberration, astigmatism, and distortion) produced by the projection system when the projection magnification is changed. The upper portion, the middle portion, and the lower portion in FIG. 12 correspond to reduction-side aberrations at the reference distance, the short distance, and the long distance in Table 10, respectively.

Example 4

Table 11 shown below shows data on the lens surfaces in Example 4.

TABLE 11

F 2.80
FNo 2.00
ω 72.0

| Surface number | R | D | Nd | Vd | H |
|---|---|---|---|---|---|
| OBJ | Infinity | 6.060 | | | |
| 1 | Infinity | 22.920 | 1.51633 | 64.1 | |
| 2 | Infinity | 1.000 | | | |
| 3 | 17.084 | 6.000 | 1.49700 | 81.5 | 12.54 |
| 4 | 43.400 | 0.200 | | | 11.99 |
| *5 | 14.486 | 6.678 | 1.49700 | 81.5 | 11.16 |
| *6 | −189.534 | 5.246 | | | 10.16 |
| 7 | 21.957 | 5.000 | 1.49700 | 81.5 | 6.50 |
| 8 | −11.622 | 1.200 | 2.00100 | 29.1 | 5.67 |
| 9 | −84.761 | 4.974 | | | 5.54 |
| STO | Infinity | 6.000 | | | 4.67 |
| 11 | −67.913 | 1.000 | 1.95375 | 32.3 | 4.50 |
| 12 | 23.369 | 3.000 | 1.84666 | 23.8 | 4.95 |
| 13 | −27.528 | d13 | | | 5.80 |
| *14 | 12.017 | 2.000 | 1.53116 | 56.0 | 10.43 |
| *15 | 14.944 | d15 | | | 10.92 |
| *16 | −70.187 | 2.000 | 1.53116 | 56.0 | 11.99 |
| *17 | 17.198 | d17 | | | 13.53 |
| *18 | −32.821 | d18 | Reflection surface | | |
| IMG | Infinity | | | | |

Table 12 shown below shows aspheric coefficients of the lens surfaces in Example 4.

TABLE 12

Even-ordered Aspheric coefficient

| | Surface number | | | |
|---|---|---|---|---|
| | 5 | 6 | 14 | 15 |
| K | 0.00000 | 0.00000 | 0.00000 | 0.00000 |
| A04 | −1.6097E−05 | 6.2859E−05 | 1.0403E−04 | 2.9044E−04 |
| A06 | 3.9511E−08 | 4.8403E−08 | −3.3133E−06 | −5.2525E−06 |
| A08 | 1.1967E−10 | 9.2184E−10 | 1.3741E−09 | 1.4807E−08 |
| A10 | 1.4798E−12 | −5.6495E−12 | 0.0000E+00 | 0.0000E+00 |
| A12 | 0.0000E+00 | 0.0000E+00 | 0.0000E+00 | 0.0000E+00 |
| A14 | 0.0000E+00 | 0.0000E+00 | 0.0000E+00 | 0.0000E+00 |

| | Surface number | | |
|---|---|---|---|
| | 16 | 17 | 18 |
| K | 30.60944 | 0.00000 | −0.80891 |
| A04 | 4.2739E−06 | −2.6911E−04 | 2.1462E−06 |
| A06 | −3.9946E−07 | 1.8068E−06 | −2.0677E−09 |
| A08 | 1.4408E−08 | −1.0467E−08 | 1.7429E−12 |
| A10 | −1.0827E−10 | 3.7751E−11 | −9.6782E−16 |
| A12 | 2.6614E−13 | −7.5006E−14 | 2.6821E−19 |
| A14 | 0.0000E+00 | 0.0000E+00 | −3.0315E−23 |

Table 13 shown below shows the values of the variable spaces d13, d15, d17, and d18 in Table 11 in a case where the projection distance is changed.

TABLE 13

| | Variable space | | |
|---|---|---|---|
| Projection distance | Reference distance | Short distance | Long distance |
| d13 | 8.649 | 8.300 | 8.972 |
| d15 | 6.889 | 7.033 | 6.725 |
| d17 | 71.184 | 71.389 | 71.025 |
| d18 | −376.756 | −306.393 | −501.541 |

Figure 13:
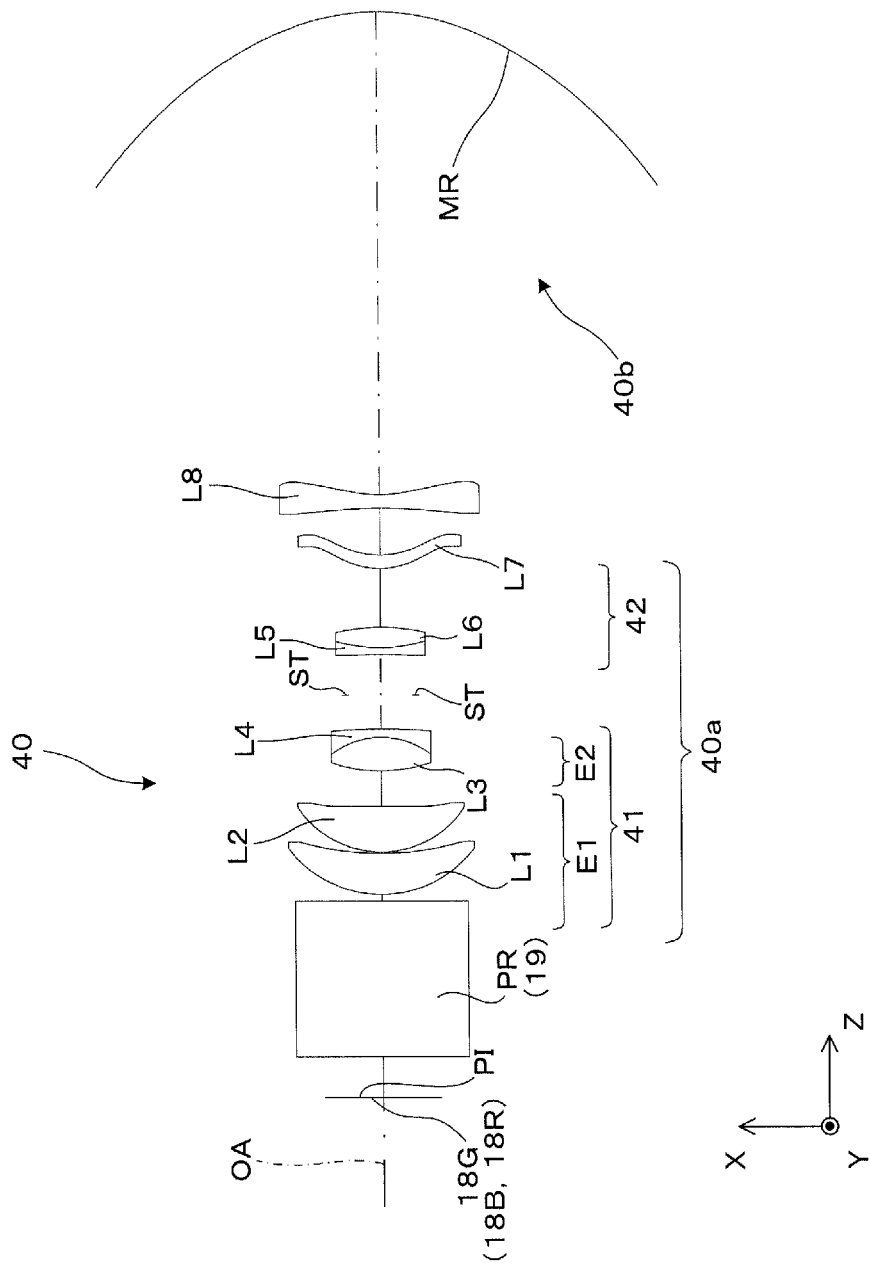
FIG. 13 shows the configuration of a projection system according to Example 4.

FIG. 13 is a cross-sectional view of the projection system according to Example 4. In Example 4, the first optical group 40a is formed of the following eight lenses: the positive first lens L1 having a meniscus shape having a convex surface facing the reduction side; the positive second lens L2 having a biconvex shape in the vicinity of the optical axis and having aspheric surfaces on opposite sides; the doublet of the positive biconvex third lens L3 and the negative fourth lens L4 having a meniscus shape having a convex surface facing the enlargement side; the doublet of the negative biconcave fifth lens L5 and the positive biconvex sixth lens L6; the positive seventh lens L7 having a meniscus shape having a convex surface facing the reduction side and having aspheric surfaces on opposite sides; and the negative biconcave eighth lens L8 having aspheric surfaces on opposite sides.

Out of the lenses described above, the effective aperture diameter ratio exceeds 1.2 for the first time between the sixth lens L6 and the seventh lens L7. That is, the first-first lens group 41 is formed of the lenses L1 to L6, and the first-second lens group 42 is formed of the lenses L7 and L8. The aperture stop ST is positioned between the fourth lens L4 and the fifth lens L5. That is, in the first-first lens group 41, the lens group E1 is formed of the lenses L1 to L4, and the lens group E2 is formed of the lenses L5 and L6. The mirror MR, which forms the second optical group 40b, is formed of a single aspheric mirror having a concave shape.

Figure 14:
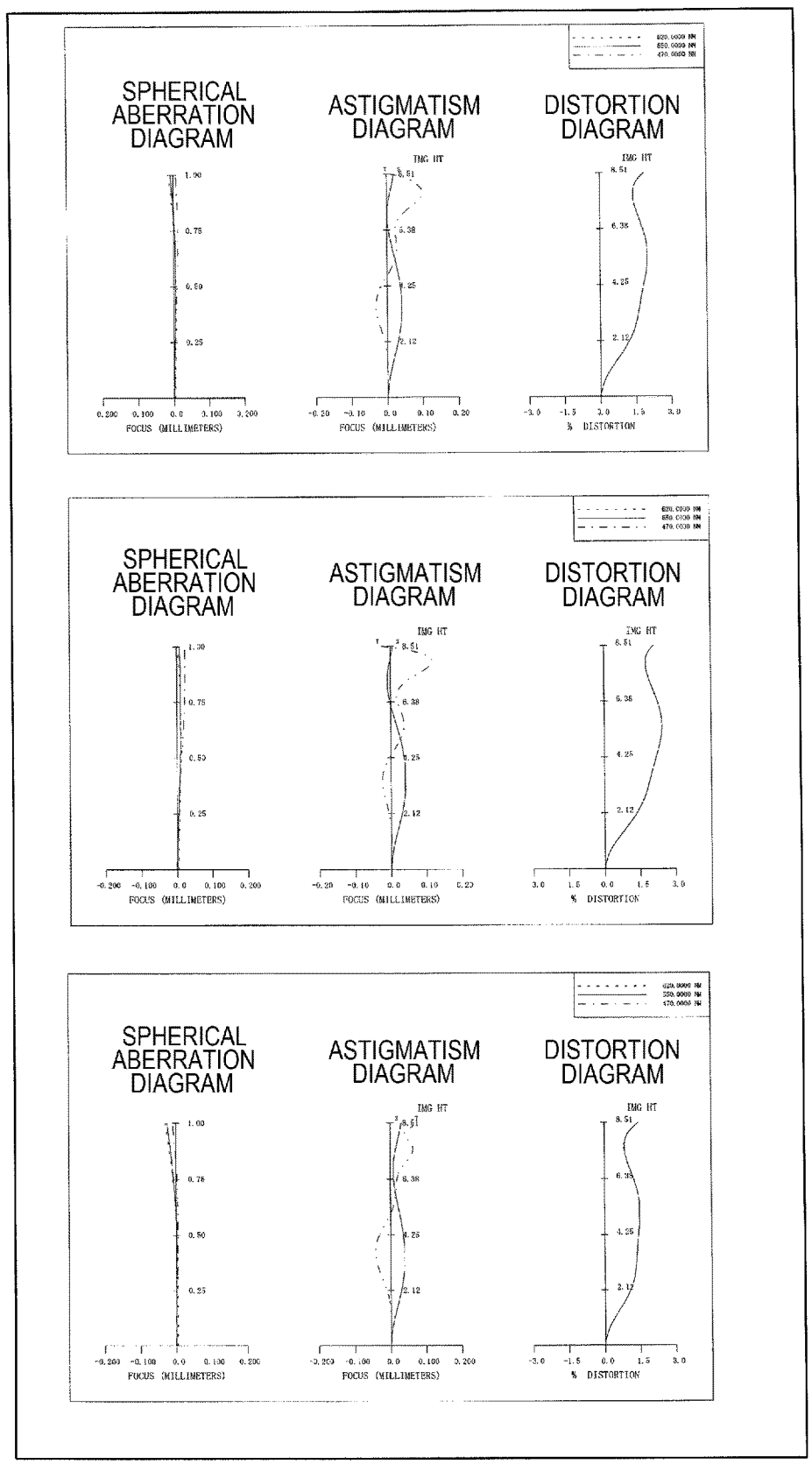
FIG. 14 shows reduction-side aberrations produced by the projection system according to Example 4.

FIG. 14 shows reduction-side aberrations (spherical aberration, astigmatism, and distortion) produced by the projection system when the projection magnification is changed. The upper portion, the middle portion, and the lower portion in FIG. 14 correspond to reduction-side aberrations at the reference distance, the short distance, and the long distance in Table 13, respectively.

Example 5

Table 14 shown below shows data on the lens surfaces in Example 5. In the present example and Example 6, which will be described later, a change is made to Example 2, in which the first optical group 40a and the second optical group 40b are separate from each other by a long distance, in such a way that the restriction imposed on the overall length of the projection system is relieved, that is, the overall length is allowed to be prolonged to achieve simplification of the configuration of the first optical group 40a. In this case, high-refractive-index glass and odd-numbered aspherical surfaces are effectively disposed, as in Examples 3 and 4, to reduce the number of lenses in the first-first-lens group 41 of the first optical group 40a by two in Example 5 and by three in Example 6. The first-second lens group 42 has the two-lens configuration.

TABLE 14

F 2.87
FNo 2.03
ω 72.1

| Surface number | R | D | Nd | Vd | H |
|---|---|---|---|---|---|
| OBJ | Infinity | 6.060 | | | |
| 1 | Infinity | 22.920 | 1.51633 | 64.1 | |
| 2 | Infinity | 1.000 | | | |
| *3 | −36185.342 | 4.000 | 1.53116 | 56.0 | 11.87 |
| *4 | −42.399 | 0.100 | | | 11.25 |
| 5 | 22.163 | 7.000 | 1.49700 | 81.5 | 11.32 |
| 6 | −30.801 | 1.500 | 2.00069 | 25.5 | 11.00 |
| 7 | −69.549 | 24.975 | | | 10.93 |
| STO | Infinity | 3.000 | | | 7.52 |
| 9 | −53.215 | 4.000 | 1.59551 | 39.2 | 7.65 |
| 10 | −12.839 | 1.000 | 2.00100 | 29.1 | 7.83 |
| 11 | −18.719 | d11 | | | 8.23 |
| *12 | 222.683 | 4.000 | 1.53116 | 56.0 | 13.28 |
| *13 | −35.444 | d13 | | | 13.69 |
| **14 | −78.648 | 2.000 | 1.53116 | 56.0 | 16.09 |
| **15 | 26.330 | d15 | | | 16.95 |
| **16 | −34.762 | d16 | Reflection surface | | |
| IMG | Infinity | | | | |

Table 15 shown below shows aspheric coefficients of the lens surfaces in Example 5.

TABLE 15

Even-ordered Aspheric coefficient

| | Surface number | | | |
|---|---|---|---|---|
| | 3 | 4 | 12 | 13 |
| K | 0.00000 | 0.00000 | 0.00000 | 0.00000 |
| A04 | 1.0613E−04 | 9.2392E−05 | −1.2591E−04 | −1.0691E−04 |
| A06 | 2.3054E−07 | 4.4605E−07 | −2.0326E−07 | 1.8193E−07 |
| A08 | −9.3474E−10 | −1.2445E−09 | 4.0089E−09 | 1.1177E−09 |
| A10 | 6.8572E−12 | 1.3931E−11 | −7.0349E−12 | −3.6568E−13 |
| A12 | 0.0000E+00 | 0.0000E+00 | 0.0000E+00 | 0.0000E+00 |
| A14 | 0.0000E+00 | 0.0000E+00 | 0.0000E+00 | 0.0000E+00 |

TABLE 15-continued

Odd-ordered Aspheric coefficient

| | Surface number | | |
|---|---|---|---|
| | 14 | 15 | 16 |
| K | −1.00000 | 0.00000 | −2.51308 |
| A03 | 0.0000E+00 | 0.0000E+00 | 0.0000E+00 |
| A04 | 0.0000E+00 | 0.0000E+00 | 0.0000E+00 |
| A05 | −2.1271E−04 | −2.0210E−04 | −2.8104E−05 |
| A06 | 3.9331E−05 | −1.7266E−05 | 3.2554E−07 |
| A07 | −1.5372E−06 | 2.7738E−07 | −7.5845E−08 |
| A08 | 2.4381E−07 | −1.1949E−07 | 1.9325E−09 |
| A09 | 1.4585E−08 | 1.5406E−09 | −9.4264E−12 |
| A10 | −3.1734E−09 | 8.2651E−12 | −1.9227E−13 |
| A11 | 5.8452E−11 | −2.3320E−12 | 0.0000E+00 |
| A12 | 2.0366E−12 | −2.1941E−13 | 2.8040E−17 |
| A13 | 0.0000E+00 | 2.0247E−14 | 0.0000E+00 |
| A14 | 0.0000E+00 | 1.8615E−16 | 0.0000E+00 |

Table 16 shown below shows the values of the variable spaces d11, d13, d15, and d16 in Table 14 in a case where the projection distance is changed.

TABLE 16

| | Variable space | | | |
|---|---|---|---|---|
| Projection distance | Reference distance | Short distance | Long distance |
| d11 | 29.955 | 29.306 | 30.787 |
| d13 | 9.490 | 9.586 | 9.394 |
| d15 | 129.000 | 129.554 | 128.265 |
| d16 | −376.756 | −306.271 | −503.064 |

Table 17 shown below shows data on the first and second optical path deflectors, which are each a folding surface that folds the optical path, and the mirror MR, that is, the second optical group 40b. Rotation f represents the inclination of each of the reflection surfaces with respect to the orientation of the optical axis OA extending from the first optical group 40a. The projection distance is assumed to be the reference distance.

TABLE 17

Data on folding surface

| Surface number | R | D | Rotation β | |
|---|---|---|---|---|
| **15 | 26.330 | 29.000 | 0.0 | |
| 15-1 | Infinity | 0.000 | −35.0 | Reflection surface |
| 15-2 | Infinity | −55.000 | −35.0 | |
| 15-3 | Infinity | 0.000 | 35.0 | Reflection surface |
| 15-4 | Infinity | 45.000 | 35.0 | |
| **16 | −34.762 | 376.756 | 0.0 | Reflection surface |

Figure 15:
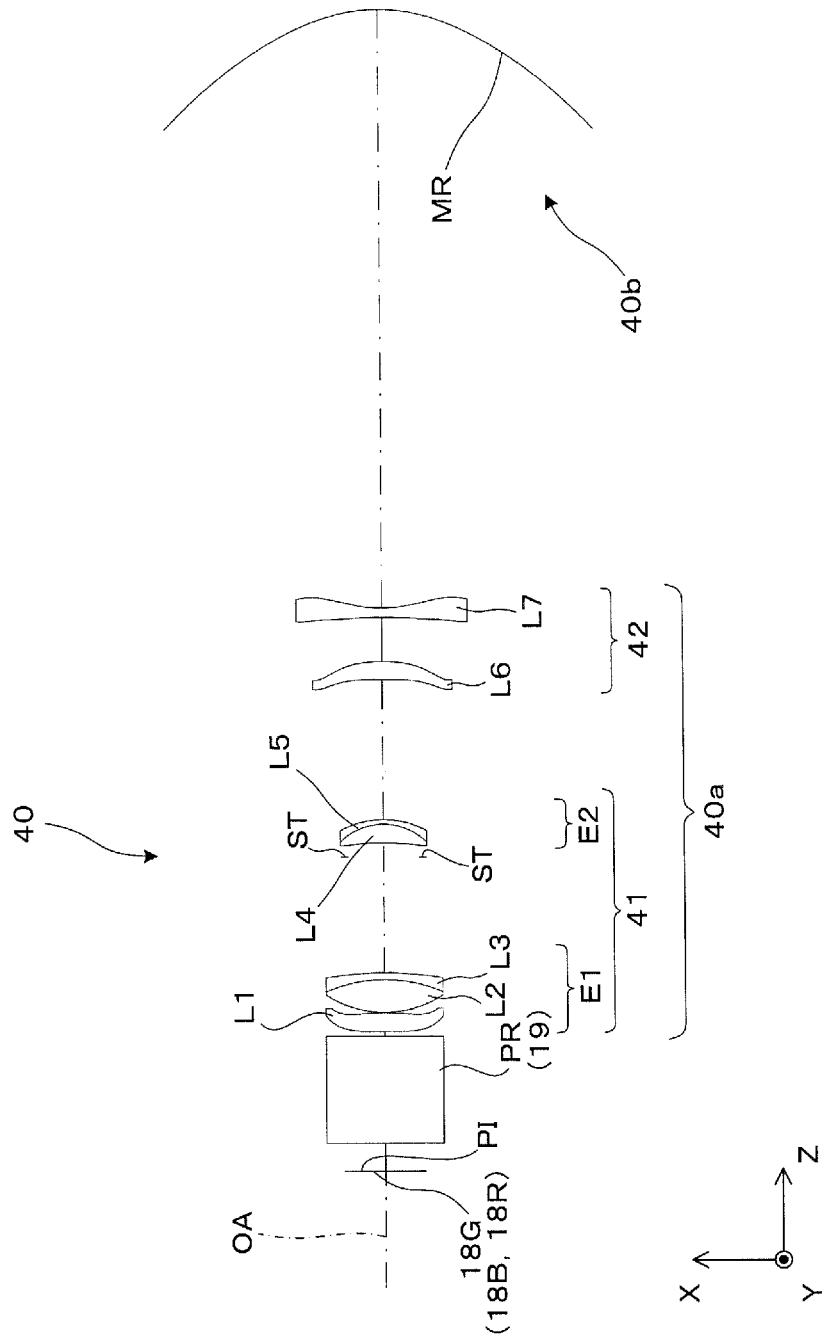
FIG. 15 shows the configuration of a projection system according to Example 5.

FIG. 15 is a cross-sectional view of the projection system according to Example 5. In FIG. 15, the first and second optical path deflectors, which each only fold the optical path but have no power, are omitted, and the folding operation of the two optical path deflectors is drawn in the form of a development. In Example 5, the first optical group 40a is formed of the following seven lenses: the positive first lens L1 having a meniscus shape having a convex surface facing the reduction side and having aspheric surfaces on opposite sides; the doublet of the positive biconvex second lens L2 and the negative third lens L3 having a meniscus shape having a convex surface facing the enlargement side; the positive fourth lens L4 having a meniscus shape having a convex surface facing the enlargement side; the negative fifth lens L5 having a meniscus shape having a convex surface facing the enlargement side and having aspheric surfaces on opposite sides; the positive sixth lens L6 having a meniscus shape having aspheric surfaces on opposite sides; and the negative biconcave seventh lens L7 having aspheric surfaces on opposite sides.

Out of the lenses described above, the effective aperture diameter ratio exceeds 1.2 for the first time between the fifth lens L5 and the sixth lens L6. That is, the first-first lens group 41 is formed of the lenses L1 to L5, and the first-second lens group 42 is formed of the lenses L6 and L7. The aperture stop ST is positioned between the third lens L3 and the fourth lens L4. That is, in the first-first lens group 41, the lens group E1 is formed of the lenses L1 to L3, and the lens group E2 is formed of the lenses L4 and L5. The mirror MR, which forms the second optical group 40b, is formed of a single aspheric mirror having a concave shape.

Figure 16:
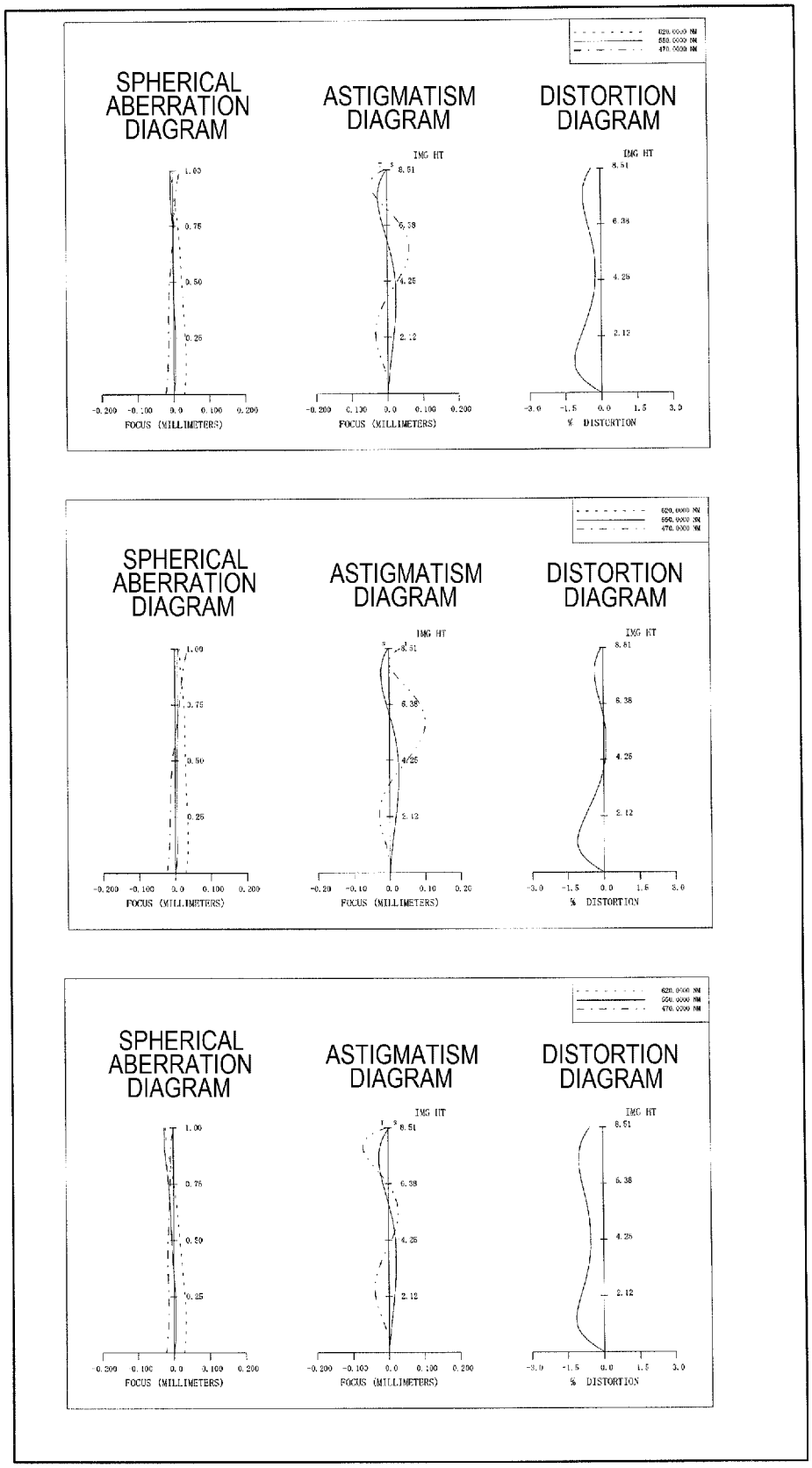
FIG. 16 shows reduction-side aberrations produced by the projection system according to Example 5.

FIG. 16 shows reduction-side aberrations (spherical aberration, astigmatism, and distortion) produced by the projection system when the projection magnification is changed. The upper portion, the middle portion, and the lower portion in FIG. 16 correspond to reduction-side aberrations at the reference distance, the short distance, and the long distance in Table 16, respectively.

Example 6

Table 18 shown below shows data on the lens surfaces in Example 6.

TABLE 18

| F 2.86 | | | | |
|---|---|---|---|---|
| FNo 2.00 | | | | |
| ω 72.0 | | | | |

| Surface number | R | D | Nd | Vd | H |
|---|---|---|---|---|---|
| OBJ | Infinity | 6.060 | | | |
| 1 | Infinity | 22.920 | 1.51633 | 64.1 | |
| 2 | Infinity | 1.000 | | | |
| *3 | 19.650 | 9.000 | 1.61881 | 63.9 | 11.56 |
| *4 | −21.338 | 1.729 | | | 11.00 |
| 5 | −24.111 | 1.000 | 2.00069 | 25.5 | 9.62 |
| 6 | −61.886 | 20.002 | | | 9.60 |
| STO | Infinity | 3.000 | | | 6.86 |
| 8 | −27.009 | 4.000 | 1.59551 | 39.2 | 7.01 |
| 9 | −10.097 | 1.000 | 2.00100 | 29.1 | 7.29 |
| 10 | −14.448 | d10 | | | 7.86 |
| *11 | 42.699 | 4.000 | 1.53116 | 56.0 | 13.38 |
| *12 | −49.865 | d12 | | | 13.64 |
| **13 | 1178.074 | 2.000 | 1.53116 | 56.0 | 15.52 |
| **14 | 19.155 | d14 | | | 16.61 |
| **15 | −33.310 | d15 | Reflection surface | | |
| IMG | Infinity | 0 | | | |

Table 19 shown below shows aspheric coefficients of the lens surfaces in Example 6.

TABLE 19

| Even-ordered Aspheric coefficient | | | | |
|---|---|---|---|---|
| | Surface number | | | |
| | 3 | 4 | 11 | 12 |
| K | 0.00000 | 0.00000 | 0.00000 | 0.00000 |
| A04 | −6.8964E−06 | 4.1370E−05 | −1.8207E−04 | −1.7074E−04 |
| A06 | 1.1594E−08 | 1.3996E−08 | −1.7112E−07 | 7.9482E−07 |
| A08 | −4.5818E−12 | 0.0000E+00 | 3.5106E−09 | −3.4158E−09 |
| A10 | 3.2041E−13 | 0.0000E+00 | −2.4709E−12 | 1.2368E−11 |
| A12 | 0.0000E+00 | 0.0000E+00 | 0.0000E+00 | 0.0000E+00 |
| A14 | 0.0000E+00 | 0.0000E+00 | 0.0000E+00 | 0.0000E+00 |

| Odd-ordered Aspheric coefficient | | | |
|---|---|---|---|
| | Surface number | | |
| | 13 | 14 | 15 |
| K | −1.00000 | 0.00000 | −2.36678 |
| A03 | 1.3870E−05 | 0.0000E+00 | −1.6949E−05 |
| A04 | 2.9341E−05 | −1.7758E−05 | 1.9216E−07 |
| A05 | 4.3396E−07 | 0.0000E+00 | −5.9830E−08 |
| A06 | 3.4114E−07 | −4.8134E−07 | 1.2839E−09 |
| A07 | 1.2704E−09 | 0.0000E+00 | −1.0566E−11 |
| A08 | −5.0653E−09 | 1.0297E−09 | 1.0607E−13 |
| A09 | 0.0000E+00 | 0.0000E+00 | 0.0000E+00 |
| A10 | 1.8614E−11 | 1.7032E−13 | −7.2515E−18 |
| A11 | 0.0000E+00 | 0.0000E+00 | 0.0000E+00 |
| A12 | −2.5474E−14 | −3.9102E−15 | −2.6254E−20 |
| A13 | 0.0000E+00 | 0.0000E+00 | 0.0000E+00 |
| A14 | 0.0000E+00 | 0.0000E+00 | 8.1641E−24 |

Table 20 shown below shows the values of the variable spaces d10, d12, d14, and d15 in Table 18 in a case where the projection distance is changed.

TABLE 20

| Variable space | | | |
|---|---|---|---|
| Projection distance | Reference distance | Short distance | Long distance |
| d10 | 26.680 | 26.134 | 27.486 |
| d12 | 5.155 | 5.202 | 5.118 |
| d14 | 140.724 | 141.225 | 139.956 |
| d15 | −376.756 | −305.860 | −503.928 |

Table 21 shown below shows data on the first and second optical path deflectors, which are each a folding surface that folds the optical path, and the mirror MR, that is, the second optical group 40b. Rotation f represents the inclination of each of the reflection surfaces with respect to the orientation of the optical axis OA extending from the first optical group 40a. The projection distance is assumed to be the reference distance.

TABLE 21

| Surface number | R | D | Rotation β | |
|---|---|---|---|---|
| **14 | 19.155 | 30.724 | 0.0 | |
| 14-1 | Infinity | 0.000 | −32.0 | Reflection surface |
| 14-2 | Infinity | −61.000 | −32.0 | |
| 14-3 | Infinity | 0.000 | 32.0 | Reflection surface |
| 14-4 | Infinity | 49.000 | 32.0 | |
| **15 | −33.310 | d15 | 0.0 | Reflection surface |

Figure 17:
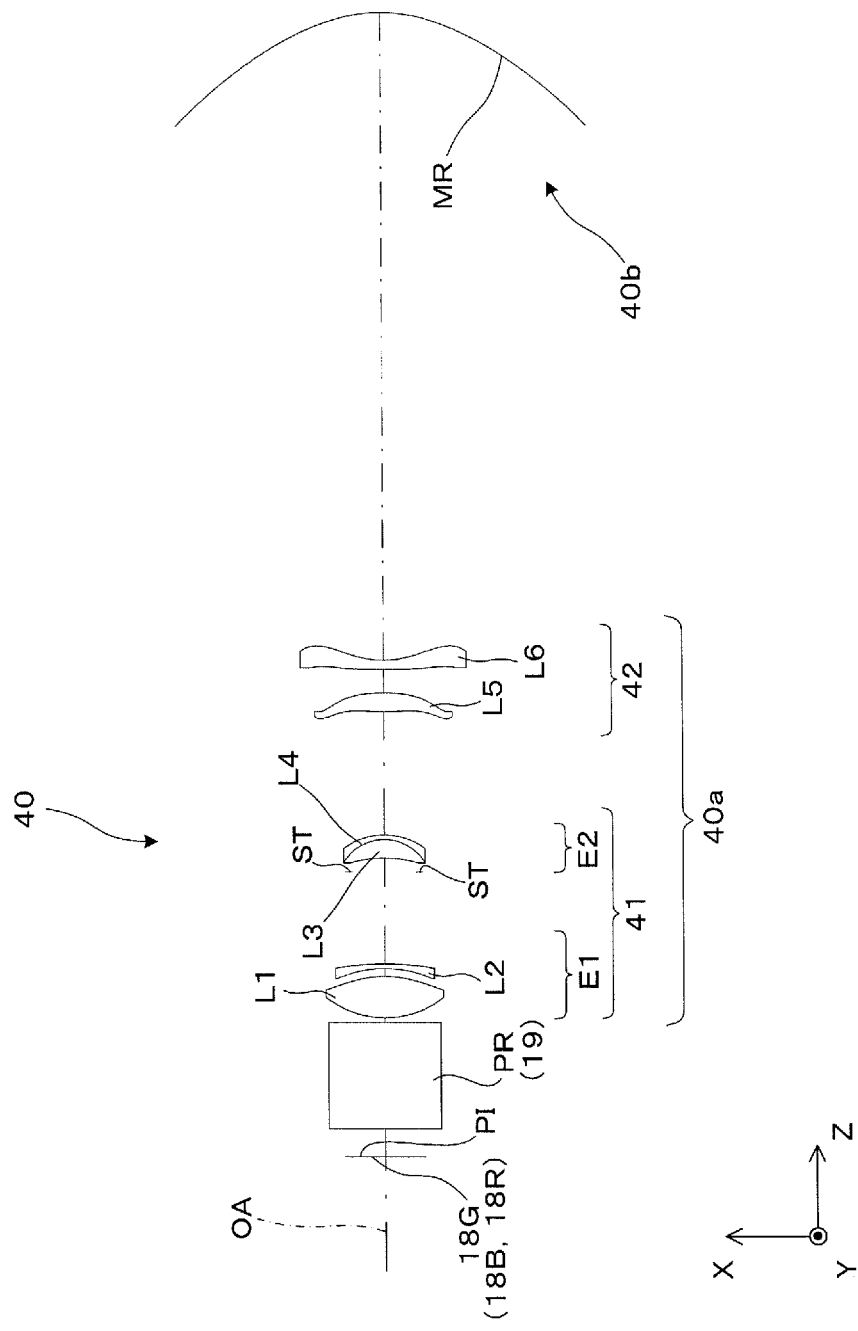
FIG. 17 shows the configuration of a projection system according to Example 6.

FIG. 17 is a cross-sectional view of the projection system according to Example 6. In FIG. 17, the first and second optical path deflectors, which each only fold the optical path but have no power, are omitted, and the folding operation of the two optical path deflectors is drawn in the form of a development. In Example 6, the first optical group 40a is formed of the following six lenses: the positive biconvex first lens L1; the negative second lens L2 having a meniscus shape having a convex surface facing the enlargement side; the doublet of the positive third lens L3 having a meniscus shape having a convex surface facing the enlargement side and the negative fourth lens L4 having a meniscus shape having a convex surface facing the enlargement side; the positive biconvex fifth lens L5 having aspheric surfaces on opposite sides; and the negative sixth lens L6 having a meniscus shape having a convex surface facing the enlargement side in the vicinity of the optical axis and having aspheric surfaces on opposite sides.

Out of the lenses described above, the effective aperture diameter ratio exceeds 1.2 for the first time between the fourth lens L4 and the fifth lens L5. That is, the first-first lens group 41 is formed of the lenses L1 to L4, and the first-second lens group 42 is formed of the lenses L5 and L6. The aperture stop ST is positioned between the second lens L2 and the third lens L3. That is, in the first-first lens group 41, the lens group E1 is formed of the lenses L1 and L2, and the lens group E2 is formed of the lenses L3 and L4. The mirror MR, which forms the second optical group 40b, is formed of a single aspheric mirror having a concave shape.

Figure 18:
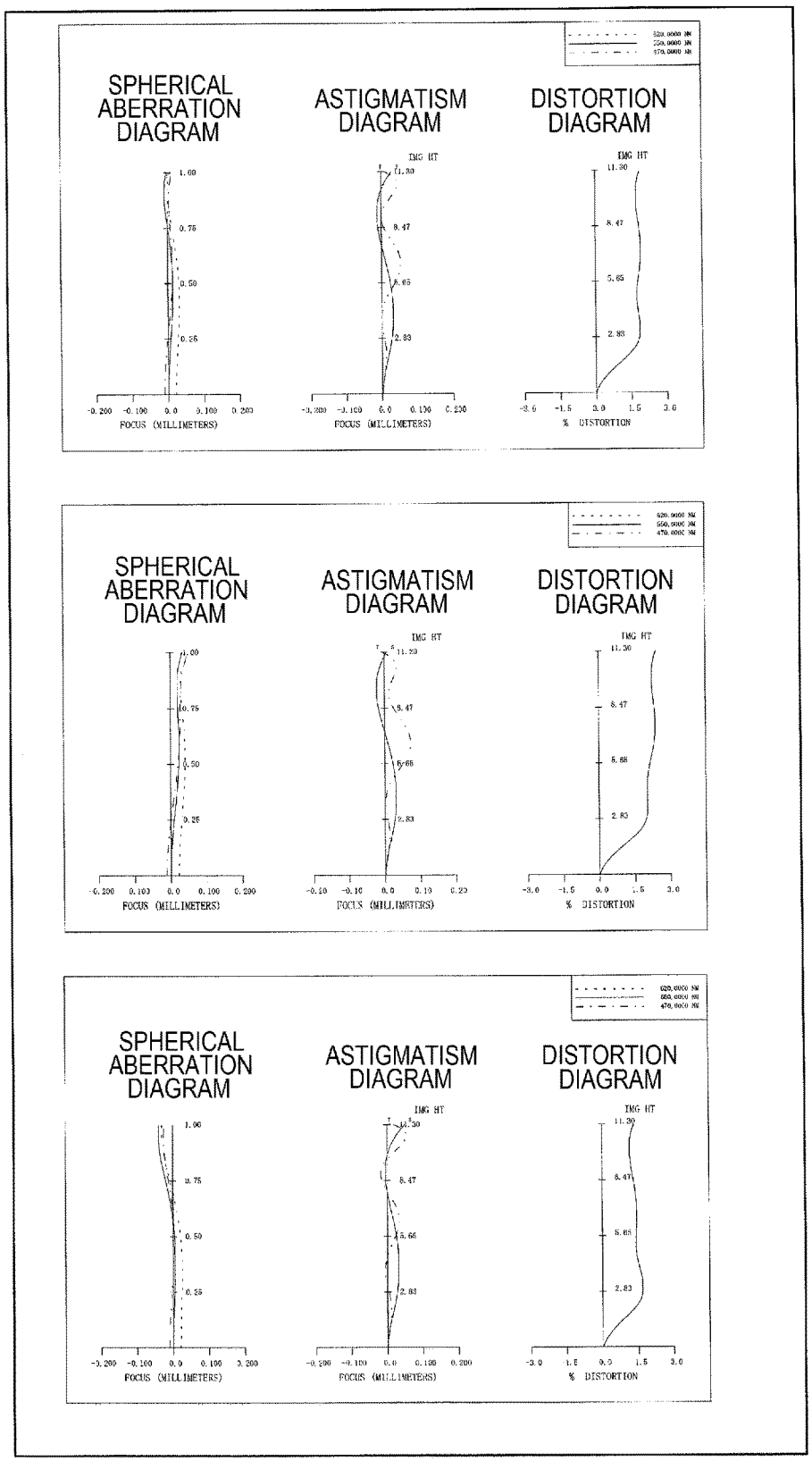
FIG. 18 shows reduction-side aberrations produced by the projection system according to Example 6.

FIG. 18 shows reduction-side aberrations (spherical aberration, astigmatism, and distortion) produced by the projection system when the projection magnification is changed. The upper portion, the middle portion, and the lower portion in FIG. 18 correspond to reduction-side aberrations at the reference distance, the short distance, and the long distance in Table 20, respectively.

In Examples 5 and 6 described above, relief of the restriction imposed on the overall length of the projection system to some extent, that is, permission to prolong the overall length, employment of high-refractive-index glass, and employment of odd-numbered aspheric surfaces in the first-second lens group 42 allow further reduction in the number of lenses.

Outline of Examples

In each of Examples, a wide half angle of view greater than or equal to 70 degrees at the wide-angle end is achieved in a compact configuration. The variety of conditions described above, that is, Conditional Expressions (1) to (5) are as follows and satisfied in Examples.

TABLE 22

| | Example 1 | Example 2 | Example 3 | Example 4 | Example 5 | Example 6 |
|---|---|---|---|---|---|---|
| TL | 120.020 | 175.020 | 120.020 | 130.020 | 220.020 | 218.292 |
| f | 2.832 | 2.840 | 2.813 | 2.805 | 2.873 | 2.857 |
| f1 | 10.896 | 20.750 | 11.600 | 11.902 | 23.289 | 26.618 |
| f2 | −14.995 | −16.315 | −15.946 | −16.411 | −17.381 | −16.655 |
| f12 | −72.129 | 174.446 | −45.448 | −44.284 | −210.152 | 2459.270 |
| fp | 43.045 | 35.277 | 57.237 | 92.979 | 57.660 | 43.800 |
| fn | −20.000 | −33.460 | −21.017 | −25.703 | −36.754 | −36.541 |
| D | 60.119 | 113.000 | 69.827 | 71.184 | 129.000 | 140.724 |

| Conditional Numerical expression examples | Example 1 | Example 2 | Example 3 | Example 4 | Example 5 | Example 6 |
|---|---|---|---|---|---|---|
| (1) $0.05 < f1/TL < 0.2$ | 0.091 | 0.119 | 0.097 | 0.092 | 0.106 | 0.122 |
| (2) $0.1 < f/|f2| < 0.3$ | 0.189 | 0.174 | 0.176 | 0.171 | 0.165 | 0.172 |
| (3) $|f/f12| < 0.1$ | 0.039 | 0.016 | 0.062 | 0.063 | 0.014 | 0.001 |
| (4) $0.3 < |fn/fp| < 1.5$ | 0.465 | 0.948 | 0.367 | 0.276 | 0.637 | 0.834 |
| (5) $0.1 < f1/D < 0.3$ | 0.181 | 0.184 | 0.166 | 0.167 | 0.181 | 0.189 |

As described above, in a specific aspect of the invention, the projection system satisfies the following conditional expression:

$$0.1<f/|f2|<0.3 \quad (2)$$

where f represents the focal length of the entire projection system, and f2 represents the focal length of the second optical group. In this case, a wide field angle can be achieved, and too large a mirror that forms the second optical group 40b can be avoided. Further, too deep a mirror that forms the second optical group 40b can be avoided.

In another aspect of the invention, the first-second group is formed of a positive lens having positive power and having a convex surface facing the reduction side and a negative lens having negative power with the positive lens and the negative lens arranged from the reduction side, and the first-second group has a plurality of aspheric surfaces. The projection system then satisfies the following conditional expression:

$$|f/f12|<0.1 \quad (3), \text{and}$$

$$0.2<|fn/fp|<1.2 \quad (4)$$

where f represents the focal length of the entire projection system, f12 represents the focal length of the first-second group, fp represent the focal length of the positive lens, and fn represents the focal length of the negative lens. In this case, the focusing performance can be satisfactorily maintained.

In still another aspect of the invention, in the first-second lens group, at least one of the lenses is moved in the optical axis direction when focusing is performed in association with a change in magnification to bring an image into focus. In this case, the first-second lens group is used to perform desired focusing.

In still another aspect of the invention, at least one optical path deflector for deflecting the optical path is disposed between the first optical group and the second optical group. In this case, the optical path can be folded.

In still another aspect of the invention, two optical path deflectors each for deflecting the optical path are disposed between the first optical group and the second optical group. In this case, the optical path can be folded twice.

In still another aspect of the invention, the two optical path deflectors have two reflection surfaces facing each other. In this case, the second optical group can be shifted.

In still another aspect of the invention, the two optical path deflectors are so positioned by a holder that is molded integrally therewith. In this case, the first and second optical path deflectors incline with respect to the optical axis by a specific angle and can be fixed with the arrangement of the two optical path deflectors maintained.

In still another aspect of the invention, the projection system satisfies the following conditional expression:

$$0.1<f1/D<0.3 \quad (5)$$

where D represents the size of the air space between the first optical group and the second optical group. In this case, for example, the distance between the first optical group and the second optical group can be increased, whereby the two optical path deflectors can be efficiently disposed.

The invention is not limited to the embodiments or Examples described above and can be implemented in a variety of aspects to the extent that the aspects do not depart from the substance of the invention.

For example, in each of Examples, at least one lens having substantially no power can be added in a position upstream or downstream of the lenses that form each of the lens groups or between any adjacent ones of the lenses that form each of the lens groups.

The target to be enlarged and projected by the projection system 40 is not limited to a liquid crystal panel, and an image formed by a digital micromirror device in which micromirrors serve as pixels or by any other light modulation device can be enlarged and projected by the projection system 40.

The entire disclosure of Japanese Patent Application No. 2018-050566, filed on Mar. 19, 2018 is expressly incorporated by reference herein.

What is claimed is:

1. A projection system comprising:
a first optical group formed of a plurality of lenses and having positive power and a second optical group formed of a single reflection surface having a concave shape with the first optical group and the second optical group sequentially arranged from a reduction side,
wherein the first optical group forms an intermediate image of an image in a reduction-side conjugate position,
the second optical group enlarges and projects the intermediate image formed by the first optical group,
the first optical lens group includes a first-first lens group having positive power and a first-second lens group having positive or negative power, and a boundary between the first-first lens group and the first-second lens group is specified by a ratio between effective aperture diameters of lens surfaces of adjacent lenses that form the first optical group with the lens surfaces separate from each other by an air space, the boundary being an air space where h2/h1 exceeds 1.2 for the first time sequentially from the reduction side, where h1 represents the effective aperture diameter of a reduction-side lens surface in the air space and h2 represents the effective aperture diameter of an enlargement-side lens surface in the air space, the first-first lens group located on the reduction-side and the first-second lens group located on the enlargement-side,
the first-second lens group is formed of two lenses, and
the projection system satisfies a conditional expression $$0.05<f1/TL<0.2 \quad (1)$$

where f1 represent a focal length of the first optical group, and TL represents a distance from a surface closest to the reduction side in the first optical group to an enlargement-side surface in the second optical group.

2. The projection system according to claim 1,
wherein the projection system satisfies a conditional expression $$0.1<f/|f2|<0.3 \quad (2)$$

where f represents a focal length of the entire projection system, and f2 represents a focal length of the second optical group.

3. A projection-type image display apparatus comprising:
a light modulation device that modulates light from a light source to form an image; and
the projection system according to claim 2 that projects the image on the light modulation device.

4. The projection system according to claim 1,
wherein the first-second group is formed of a positive lens having positive power and having a convex surface facing the reduction side and a negative lens having negative power with the positive lens and the negative lens arranged from the reduction side, and the first-second group has a plurality of aspheric surfaces, the projection system satisfies conditional expressions $$|f/f12|<0.1 \quad (3), \text{ and}$$

$$0.2<|fn/fp|<1.2 \quad (4)$$

where f represents a focal length of the entire projection system, f12 represents a focal length of the first-second group, fp represent a focal length of the positive lens, and fn represents a focal length of the negative lens.

5. A projection-type image display apparatus comprising:
a light modulation device that modulates light from a light source to form an image; and
the projection system according to claim 4 that projects the image on the light modulation device.

6. The projection system according to claim 1, wherein in the first-second lens group, at least one of the lenses is moved in an optical axis direction when focusing is performed in association with a change in magnification to bring an image into focus.

7. A projection-type image display apparatus comprising:
a light modulation device that modulates light from a light source to form an image; and
the projection system according to claim 6 that projects the image on the light modulation device.

8. The projection system according to claim 1, wherein at least one optical path deflector for deflecting an optical path is disposed between the first optical group and the second optical group.

9. The projection system according to claim 8,
wherein the projection system satisfies a conditional expression $$0.1<f1/D<0.3 \quad (5)$$

where D represents a size of the air space between the first optical group and the second optical group.

10. A projection-type image display apparatus comprising:
a light modulation device that modulates light from a light source to form an image; and
the projection system according to claim 9 that projects the image on the light modulation device.

11. A projection-type image display apparatus comprising:
a light modulation device that modulates light from a light source to form an image; and
the projection system according to claim 8 that projects the image on the light modulation device.

12. The projection system according to claim 1, wherein two optical path deflectors each for deflecting an optical path are disposed between the first optical group and the second optical group.

13. The projection system according to claim 12, wherein the two optical path deflectors have two reflection surfaces facing each other.

14. A projection-type image display apparatus comprising:
a light modulation device that modulates light from a light source to form an image; and
the projection system according to claim 13 that projects the image on the light modulation device.

15. The projection system according to claim 12, wherein the two optical path deflectors are so positioned by a holder that is molded integrally therewith.

16. A projection-type image display apparatus comprising:
a light modulation device that modulates light from a light source to form an image; and
the projection system according to claim 15 that projects the image on the light modulation device.

17. A projection-type image display apparatus comprising:
a light modulation device that modulates light from a light source to form an image; and
the projection system according to claim 12 that projects the image on the light modulation device.

18. A projection-type image display apparatus comprising:
a light modulation device that modulates light from a light source to form an image; and
the projection system according to claim 1 that projects the image on the light modulation device.

* * * * *